(12) United States Patent
Zhang et al.

(10) Patent No.: US 9,398,615 B1
(45) Date of Patent: Jul. 19, 2016

(54) CARRIER SENSING AND SYMBOL TIMING IN A WLAN SYSTEM

(75) Inventors: Hongyuan Zhang, Fremont, CA (US); Yihong Qi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 833 days.

(21) Appl. No.: 13/591,737

(22) Filed: Aug. 22, 2012

Related U.S. Application Data

(60) Provisional application No. 61/534,617, filed on Sep. 14, 2011, provisional application No. 61/531,849, filed on Sep. 7, 2011.

(51) Int. Cl.
*H04W 74/08* (2009.01)

(52) U.S. Cl.
CPC ...... *H04W 74/0816* (2013.01); *H04W 74/0825* (2013.01)

(58) Field of Classification Search
CPC .......................... H04W 74/00; H04W 74/0825
USPC ......................................................... 370/338
See application file for complete search history.

(56) References Cited

U.S. PATENT DOCUMENTS

| 5,751,466 | A | 5/1998 | Dowling et al. |
|---|---|---|---|
| 6,028,693 | A | 2/2000 | Fork et al. |
| 7,428,086 | B2 | 9/2008 | Dufour et al. |
| 7,480,234 | B1 | 1/2009 | Hart et al. |
| 7,599,332 | B2 | 10/2009 | Zelst et al. |
| 7,742,390 | B2 | 6/2010 | Mujtaba |
| 7,974,351 | B1 | 7/2011 | Yang |
| 8,144,647 | B2 | 3/2012 | Nabar et al. |
| 8,155,138 | B2 | 4/2012 | van Nee |
| 8,289,869 | B2 | 10/2012 | Sawai |
| 8,335,283 | B1 * | 12/2012 | Sun ............... H04L 7/042 375/316 |
| 8,526,351 | B2 | 9/2013 | Fischer et al. |
| 8,619,907 | B2 | 12/2013 | Mujtaba et al. |
| 8,724,720 | B2 | 5/2014 | Srinivasa et al. |
| 8,867,653 | B2 | 10/2014 | Zhang et al. |
| 8,948,283 | B2 | 2/2015 | Zhang |
| 2005/0220222 | A1 | 10/2005 | Marsili |

(Continued)

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

(Continued)

*Primary Examiner* — Ian N Moore
*Assistant Examiner* — Mewale Ambaye

(57) ABSTRACT

A method for processing a preamble of a data unit received via a communication channel, wherein the preamble includes a first preamble field having a plurality of repetitions of a sequence, includes generating a cross-correlation output signal at least in part by correlating (i) a signal corresponding to the first preamble field of a received data unit with (ii) one or more repetitions of the sequence. The method also includes generating a correlation output signal at least in part by performing a correlation operation on the cross-correlation output signal, and, based at least in part on the correlation output signal, detecting the received data unit and/or determining timing associated with the received data unit.

15 Claims, 15 Drawing Sheets

(56) References Cited

U.S. PATENT DOCUMENTS

| | | | |
|---|---|---|---|
| 2006/0002485 | A1 | 1/2006 | Moher |
| 2006/0199558 | A1 | 9/2006 | Chiodini et al. |
| 2007/0230403 | A1 | 10/2007 | Douglas et al. |
| 2008/0320541 | A1* | 12/2008 | Zinevich ............... 725/127 |
| 2009/0196163 | A1 | 8/2009 | Du |
| 2009/0258624 | A1* | 10/2009 | Gudem ............ H04B 1/109 455/234.1 |
| 2010/0040178 | A1* | 2/2010 | Sutton et al. ............ 375/345 |
| 2011/0002219 | A1 | 1/2011 | Kim et al. |
| 2012/0201316 | A1 | 8/2012 | Zhang et al. |
| 2012/0294294 | A1 | 11/2012 | Zhang |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah", *The Institute of Electrical and Electronics Engineers*, doc. No. IEEE 802.11-11/1137r6, (Mar. 2012).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

de Vegt, "Potential Compromise for 802.11ah Use Case Document", Institute of Electrical and Electronics Engineers, doc. No. IEEE 802.11-11/0457r0, (Mar. 2011).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

Lee et al., "TGaf PHY proposal," *The Institute of Electrical and Electronics Engineers*, doc. No. IEEE 802.11-12/0809r5, pp. 1-43 (Jul. 10, 2012).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Secification Framework for TGah", *The Institute of Electrical and Electronics Engineers*, doc. No. IEEE 802.11--yy/xxxxr05, (Jan. 2012).

Perahia et al., "Gigabit Wireless LANs: an overview of IEEE 802.11 ac and 80211ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Taghavi et al., "Introductory Submission for TGah", doc. No. IEEE 802.11-11/0062r0, *Institute for Electrical and Electronics Engineers*, pp. 1-5 (Jan. 14, 2011).

van Nee et al. "The 802.11 n MIMO-OFDM Standard for Wireless LAN and Beyond," Wireless Personal Communications, vol. 37, pp. 445-453 (Jun. 2006).

Vermani et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," *The Institute of Electrical and Electronics Engineers*, doc. No. IEEE 802.11-11/1311r0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al, "11ah Data Transmission Flow," *The Institute of Electrical and Electronics Engineers*, doc. No. IEEE 802.11-11/1484r1, pp. 1-15 (Nov. 2011).

(56) References Cited

OTHER PUBLICATIONS

Zhang et al., "1MHz Waveform in Wider BW", *The Institute of Electrical and Electronics Engineers*, doc. No. IEEE 802.11-12/0309r1, pp. 1-10 (Mar. 2012).

Nandula et al., "Robust Timing Synchronization for OFDM Based Wireless LAN System," IEEE Conference on Convergent Technologies for Asia-Pacific Region (TENCON 2003), vol. 4, pp. 1558-1561 (Oct. 15-17, 2003).

\* cited by examiner

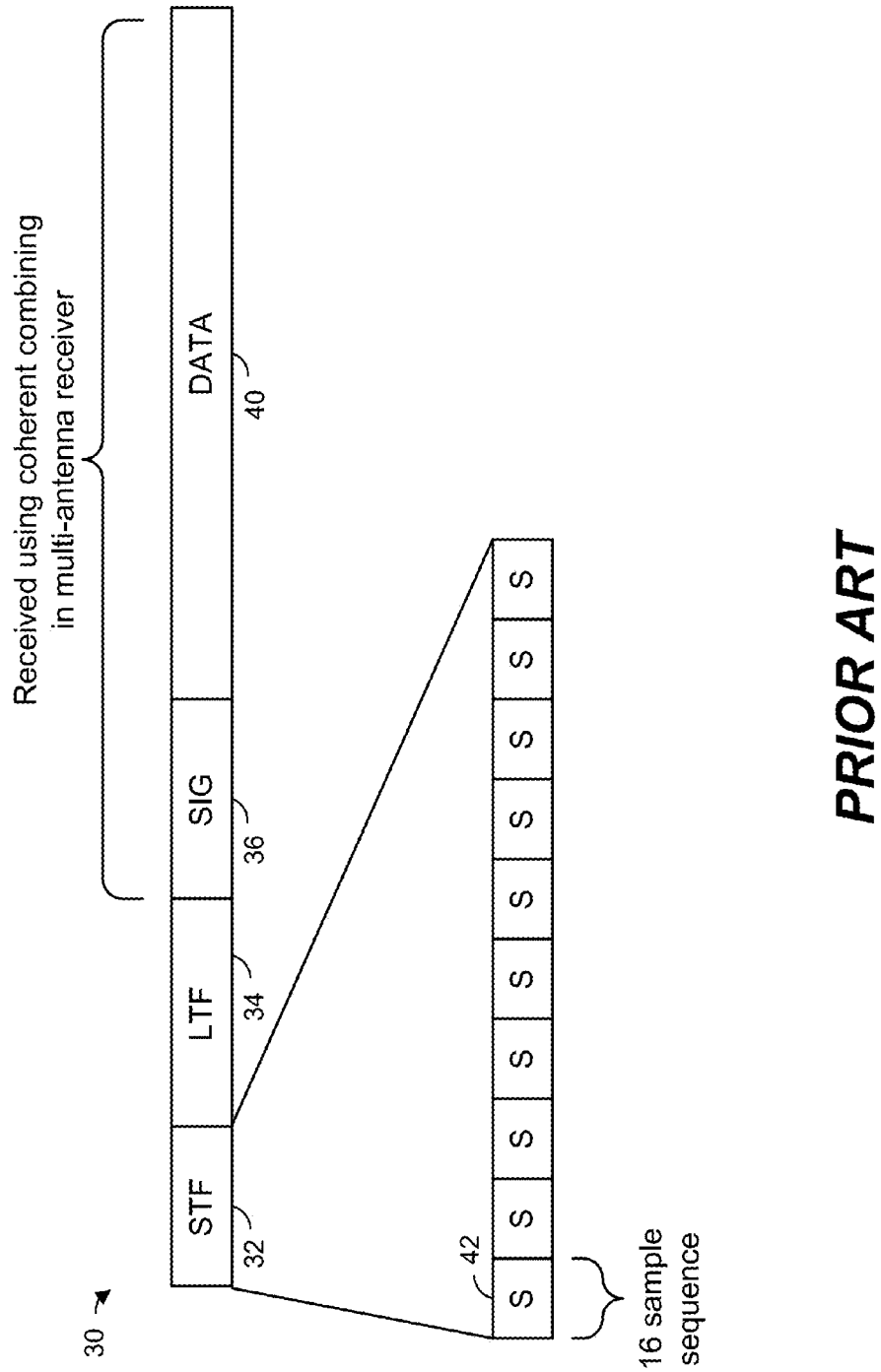

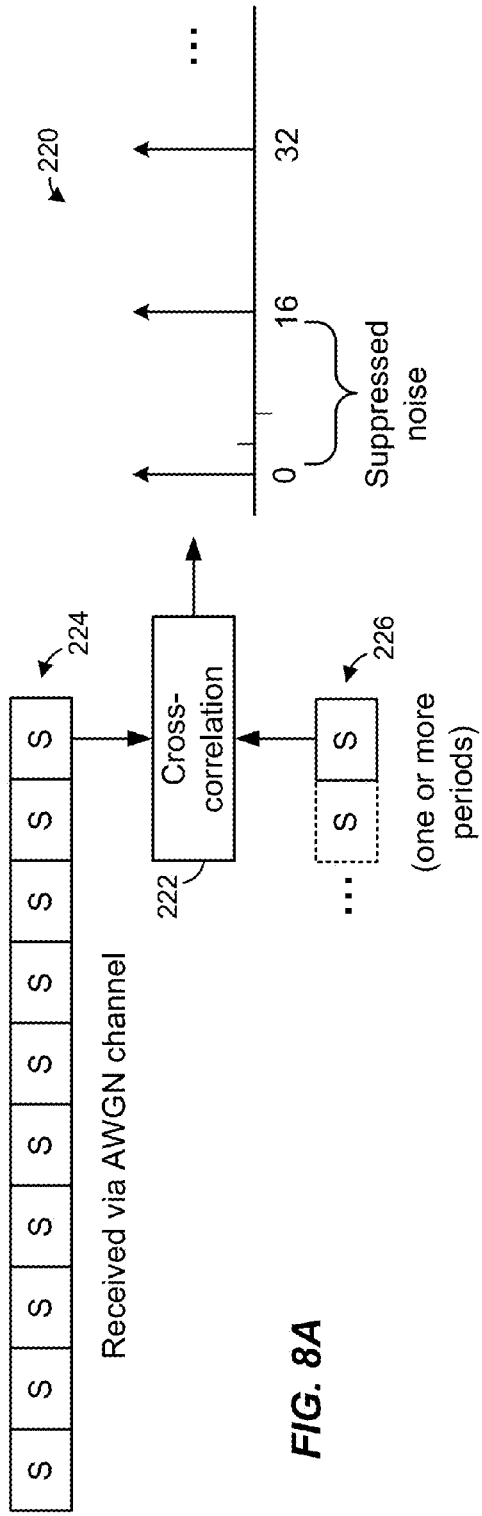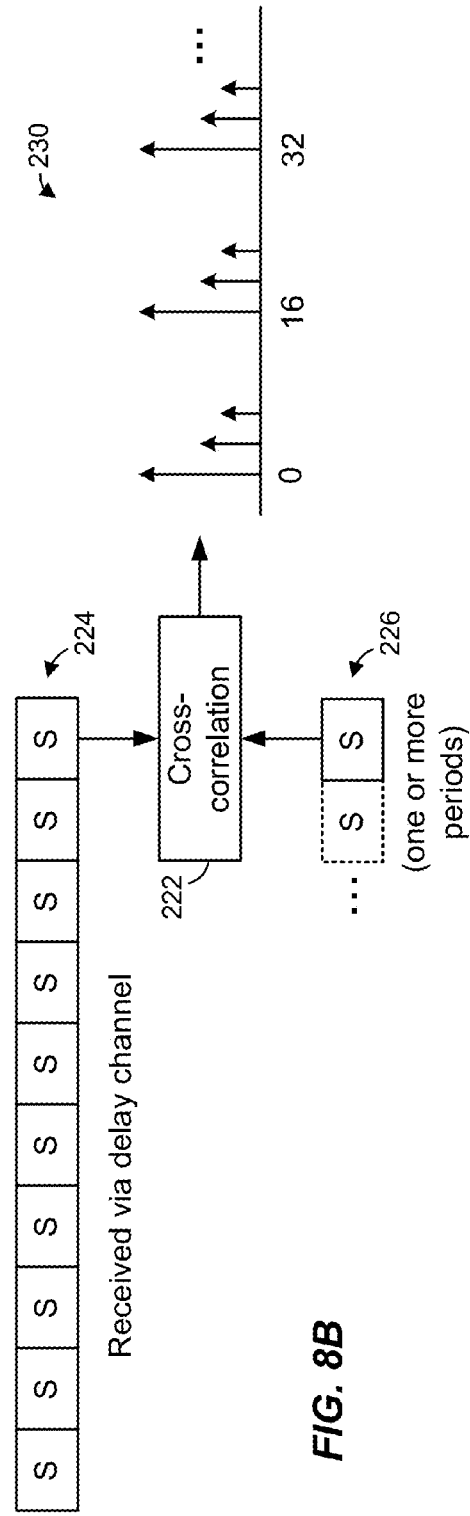

CARRIER SENSING AND SYMBOL TIMING IN A WLAN SYSTEM

CROSS REFERENCE TO RELATED APPLICATIONS

This disclosure claims the benefit of U.S. Provisional Patent Application Nos. 61/531,849, filed Sep. 7, 2011, and 61/534,617, filed Sep. 14, 2011, both entitled "Improving Carrier Sensing and Symbol Timing in WLAN System," the disclosures of which are hereby expressly incorporated herein by reference.

FIELD OF TECHNOLOGY

The present disclosure relates generally to communication networks and, more particularly, to wireless communication systems that use carrier sensing and/or symbol timing techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11 standards has improved single-user peak data throughput. For example, the IEEE 802.11a and 802.11g standards specify a single-user peak throughput of 54 megabits per second (Mbps), the IEEE 802.11n standard specifies a single-user peak throughput of 600 Mbps, and the IEEE 802.11ac standard specifies a single-user peak throughput in the Gbps range. Work has also begun on two new standards, IEEE 802.11ah and IEEE 802.11af, each of which will specify wireless network operation in sub-1 GHz frequencies. Receivers of devices in 802.11 WLAN systems such as those mentioned above typically perform carrier sensing and symbol timing operations in order to detect a received packet and determine the timing of orthogonal frequency division multiplexing (OFDM) symbols within the packet.

SUMMARY

In one embodiment, a method for processing a preamble of a data unit received via a communication channel, wherein the preamble includes a first preamble field having a plurality of repetitions of a sequence, includes generating a cross-correlation output signal at least in part by correlating (i) a signal corresponding to the first preamble field of a received data unit with (ii) one or more repetitions of the sequence, generating a correlation output signal at least in part by performing a correlation operation on the cross-correlation output signal, and, based at least in part on the correlation output signal, at least one of (i) detecting the received data unit, and (ii) determining timing associated with the received data unit.

In another embodiment, a communication device includes a network interface configured to receive data units each including a preamble having a first preamble field, wherein the first preamble field includes a plurality of repetitions of a sequence. The network interface includes a cross-correlation unit configured to generate a cross-correlation output signal at least in part by correlating (i) a signal corresponding to the first preamble field of a received data unit with (ii) one or more repetitions of the sequence. The network interface also includes a correlation unit configured to generate a correlation output signal at least in part by performing a correlation operation on the cross-correlation output signal. The network interface further includes at least one of (i) a carrier sense unit configured to detect the received data unit based at least in part on the correlation output signal, and (ii) a timing unit configured to determine timing associated with the received data unit based at least in part on the correlation output signal.

In another embodiment, a method for processing a preamble of a data unit received via a communication channel, wherein the preamble includes (i) a first repetition of a preamble field in a first subband of the communication channel and (ii) a second repetition of the preamble field in a second subband of the communication channel, wherein the first repetition of the preamble field includes a plurality of repetitions of a first sequence, and wherein the second repetition of the preamble field includes a plurality of repetitions of a second sequence, includes generating a first cross-correlation output signal at least in part by correlating (i) at least a first frequency portion of a signal corresponding to the preamble field of a received data unit with (ii) one or more repetitions of the first sequence, generating a second cross-correlation output signal at least in part by correlating (i) at least a second frequency portion of the signal with (ii) one or more repetitions of the second sequence, generating a first correlation output signal at least in part by performing a correlation operation on the first cross-correlation output signal, generating a second correlation output signal at least in part by performing a correlation operation on the second cross-correlation output signal, detecting a portion of the received data unit in the first subband based at least in part on the first correlation output signal, and detecting a portion of the received data unit in the second subband based at least in part on the second correlation output signal.

In another embodiment, a communication device includes a network interface configured to receive, via a communication channel, data units each including a preamble, wherein the preamble includes (i) a first repetition of a preamble field in a first subband of the communication channel and (ii) a second repetition of the preamble field in a second subband of the communication channel, wherein the first repetition of the preamble field includes a plurality of repetitions of a first sequence, and wherein the second repetition of the preamble field includes a plurality of repetitions of a second sequence. The network interface includes a first cross-correlation unit configured to generate a first cross-correlation output signal at least in part by correlating (i) at least a first frequency portion of a signal corresponding to the preamble field of a received data unit with (ii) one or more repetitions of the first sequence, and a second cross-correlation unit configured to generate a second cross-correlation output signal at least in part by correlating (i) at least a second frequency portion of the signal with (ii) one or more repetitions of the second sequence. The network interface also includes a first correlation unit configured to generate a first correlation output signal at least in part by performing a correlation operation on the first cross-correlation output signal, and a second correlation unit configured to generate a second correlation output signal at least in part by performing a correlation operation on the second cross-correlation output signal. The network interface further includes a first carrier sense unit configured to detect a portion of the received data unit in the first subband based at least in part on the first correlation output signal, and a second carrier sense unit configured to detect a portion of the received data unit in the second subband based at least in part on the second correlation output signal.

BRIEF DESCRIPTION OF THE DRAWINGS

FIG. 2 is a diagram of a preamble of a prior art IEEE 802.11a data unit.

FIGS. 8A and 8B illustrate example cross-correlation output signals generated by a carrier sense architecture, according to an embodiment, in the presence of an additive white Gaussian noise (AWGN) channel and in the presence of a delay channel, respectively.

DETAILED DESCRIPTION

In embodiments described below, a wireless network device such as an access point (AP) of a wireless local area network (WLAN) transmits data streams to, and/or receives data streams from, one or more client stations. The AP is configured to communicate with client stations according to a communication protocol that utilizes physical layer (PHY) data units with preambles designed to support carrier sensing (packet detection) and/or symbol timing at the receiving device. For example, in orthogonal frequency division multiplexing (OFDM) WLAN systems operating according to the IEEE 802.11a, 802.11n, or 802.11ac standards, the first part of the preamble of each PHY data unit includes a short training field (STF) with a periodically repeating sequence. Carrier sensing and symbol timing are typically conducted based on the STF of the received packet, before data is demodulated or decoded. In conventional systems, packet detection and symbol timing are both determined based on an autocorrelation performed on the received signal. The autocorrelation operation takes advantage of the periodic time domain structure of the STF, which has a known periodicity, to detect the STF and therefore detect the packet. The autocorrelation also provides an indication of the end of the STF, which coincides with the start of an OFDM symbol in a long training field (LTF) that follows the STF, to determine symbol timing.

At low signal-to-noise ratios (SNRs), these conventional systems improve the reliability of data communications by using error control coding, and/or using coherent combining with multiple receive antennas. Coherent combining generally requires channel estimation information, which a receiver typically obtains based on the LTF of received packets. As described above, however, carrier sensing and symbol timing are typically conducted based on time domain autocorrelations, without the benefit of error control coding or coherent combining. Thus, carrier sensing and symbol timing can act as a bottleneck for the sensitivity of the receiver as a whole. The conventional approach is described in further detail below with reference to FIGS. 1-4, and systems and techniques for improving carrier sensing and/or symbol timing are described below with reference to FIGS. 5-15.

Figure 1:
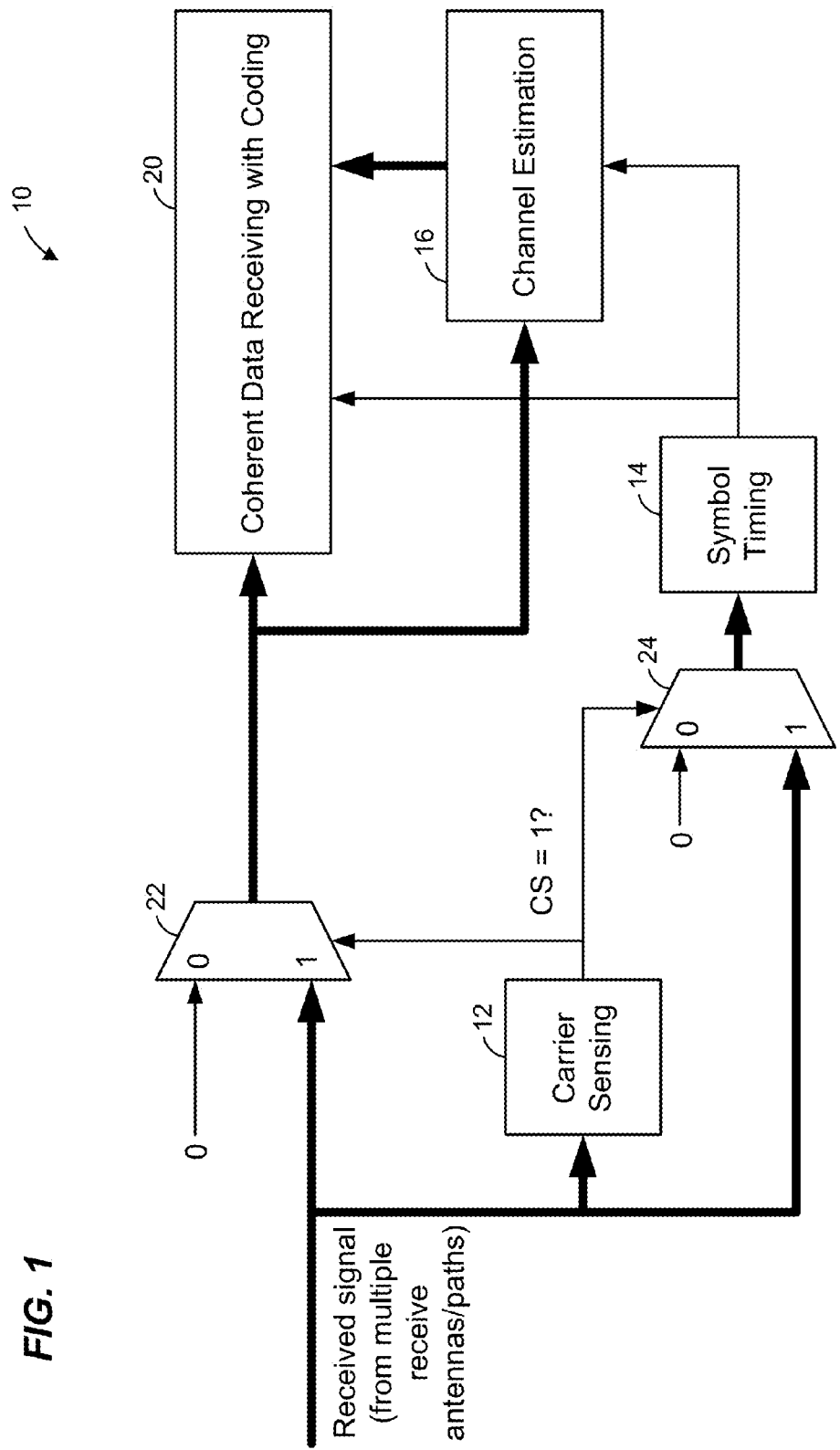
FIG. 1 is a block diagram of a prior art receiver architecture.

FIG. 1 is a block diagram of a prior art receiver architecture 10 for performing various receiver functions in OFDM-based WLAN systems such as IEEE 802.11a, 802.11g, 802.11ac, and 802.11n systems. Specifically, the architecture 10 is used to detect packets, determine symbol timing of received packets, perform channel estimation, and coherently receive coded data and signal (SIG) field information within the packets. To this end, the architecture 10 includes a carrier sensing unit 12, a symbol timing unit 14, a channel estimation unit 16, and a coherent data reception unit 20. The carrier sensing unit 12 of the architecture 10 attempts to detect a packet before the data portion of the packet is received, based on an STF in the preamble of the packet. The carrier sensing unit 12 may output a signal (shown as "CS" in FIG. 1) that indicates whether a packet has been detected. The symbol timing unit 14 attempts to determine the timing of OFDM symbols within a received packet by detecting the end of the STF and the beginning of the subsequent LTF. The channel estimation unit 16 attempts to estimate the channel via which packets are received, based on one or more LTFs in the preamble of each received packet. The coherent data reception unit 20 coherently combines signals (from multiple receive antennas) based on the symbol timing determined by the symbol timing unit 14 and the channel information estimated by the channel estimation unit 16. In particular, the coherent data reception unit 20 coherently combines signals corresponding to the SIG field and data field of received packets. The coherent data reception unit 20 also decodes the SIG field and data field according to an error control coding scheme. Both coherent combining and error control coding generally improve the reliability of data reception, particularly at low SNRs.

As seen in FIG. 1, a first multiplexor 22 accepts as an input the received signal, and passes the received signal to the channel estimation unit 16 and the coherent data reception unit 20 only if the output of carrier sensing unit 12 indicates that a packet has been detected. Similarly, a second multiplexor 24 accepts as an input the received signal, and passes the received signal to the symbol timing unit 14 only if the output of carrier sensing unit 12 indicates that a packet has been detected. Thus, the coherent data reception unit 20 and symbol timing unit 14 are only utilized if a packet has been detected by carrier sensing unit 12. The symbol timing unit 14 outputs a signal indicating symbol timing to both the channel estimation unit 16 and the coherent data reception unit 20.

While the architecture 10 coherently combines and decodes the SIG field and data field of received packets, conventional carrier sensing and symbol timing based on the STF do not make use of either error control coding or coherent combining. Instead, carrier sensing and the determination of symbol timing utilize time domain autocorrelations, as described in further detail below with reference to the prior art systems shown in FIGS. 3 and 4.

FIG. 2 is a diagram of a prior art IEEE 802.11a data unit 30. The data unit 30 includes an STF 32, an LTF 34, a SIG field 36, and a data field 40. As seen in the expanded view of FIG. 2, the STF 32 includes 10 periodically repeating sequences 42 ("S"), with each sequence 42 being 16 samples in length (for a total STF length of two OFDM symbols). The time domain periodic structure of the STF is derived by including non-zero tones at every fourth tone in the frequency domain, and then performing an inverse fast Fourier transform (IFFT) with a cyclic prefix. Although an IEEE 802.11a data unit 30 is shown in FIG. 2 for illustrative purposes, IEEE 802.11n and 802.11ac data units similarly include a preamble that begins with an STF containing a periodically repeating sequence.

Because the STF 32 exhibits 16-sample periodicity, a receiver conducts an autocorrelation by correlating each 16 samples of a received signal with the next 16 samples of the received signal. If the autocorrelation output rises (i.e., rising edge detection), a packet is detected. When the autocorrelation subsequently falls at the end of the STF 32 and beginning of the LTF 34 (i.e., falling edge detection), symbol timing is determined.

Figure 3A:
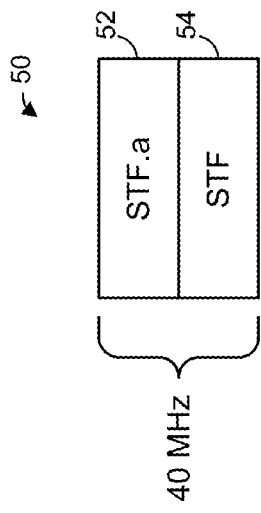
FIG. 3A is a diagram of a portion of a prior art preamble.

Some WLAN systems utilize communication channels having different bandwidths. For example, systems that operate according to the IEEE 802.11n standard may include APs and client stations configured to transmit OFDM data units in 20 MHz or 40 MHz channels, and systems that operate according to the IEEE 802.11ac standard may include APs and client stations configured to transmit OFDM data units in 20 MHz, 40 MHz, 80 MHz, or 160 MHz channels. In these systems, the STF of the preamble is duplicated in each 20 MHz subband, but with a different predetermined phase shift applied to the STF in each subband. FIG. 3A is a diagram of a portion 50 of a prior art preamble that includes a first repetition 52 and a second repetition 54 of an STF, with a phase shift a being applied to the first repetition 52. Although multiple STFs within a preamble of a composite channel data unit are referred to throughout this disclosure as "repetitions" or "duplicates" of an STF, or as a "replicated" or "duplicated" STF, it is understood that the time domain signals of the multiple STFs may differ from each other depending on which subband a particular STF occupies, and that the multiple STFs may have different phase shifts applied. For example, STFs 52 and 54 are identical in the frequency domain within each 20 MHz subband, but differ in the time domain due to their frequency offset, and have different phasing.

Figure 3B:
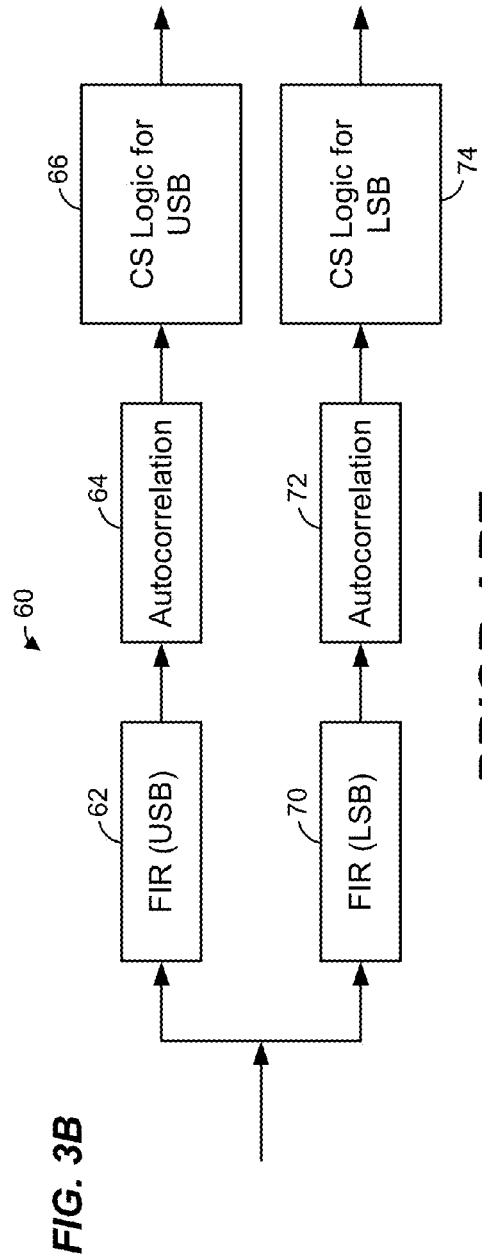
FIG. 3B is a block diagram of a prior art carrier sense architecture.

FIG. 3B is a block diagram of a prior art carrier sense architecture 60 configured to receive data units that include the preamble portion 50 of FIG. 3A (i.e., an STF replicated in each of two 20 MHz subbands). The architecture 60 includes one path for each of the two 20 MHz subbands. The first path includes a finite impulse response (FIR) filter 62 designed to pass the upper sideband (USB) of the received signal (i.e., the signal corresponding to STF repetition 52 in FIG. 3A), an autocorrelation unit 64, and carrier sense logic 66 for detecting a signal in the upper sideband. Similarly, the second path includes a FIR filter 70 designed to pass the lower sideband (LSB) of the received signal (i.e., the signal corresponding to STF repetition 54 in FIG. 3A), an autocorrelation unit 72, and carrier sense logic 74 for detecting a signal in the lower sideband. In IEEE 802.11n and 802.11ac systems, composite channels formed from multiple 20 MHz channels include one "primary" channel and one or more "secondary" channels. Typically, the output of the carrier sense logic that corresponds to the primary 20 MHz channel is given more weight, and symbol timing is determined based on the autocorrelation for the primary 20 MHz channel. For example, in a scenario where the lower sideband of a 40 MHz signal corresponds to the primary channel and the upper sideband of the 40 MHz signal corresponds to the secondary channel, the output of the carrier sense logic 74 is given more weight than the output of the carrier sense logic 66, and symbol timing is determined based on the output of the autocorrelation unit 72 rather than the output of autocorrelation unit 64.

Figure 4:
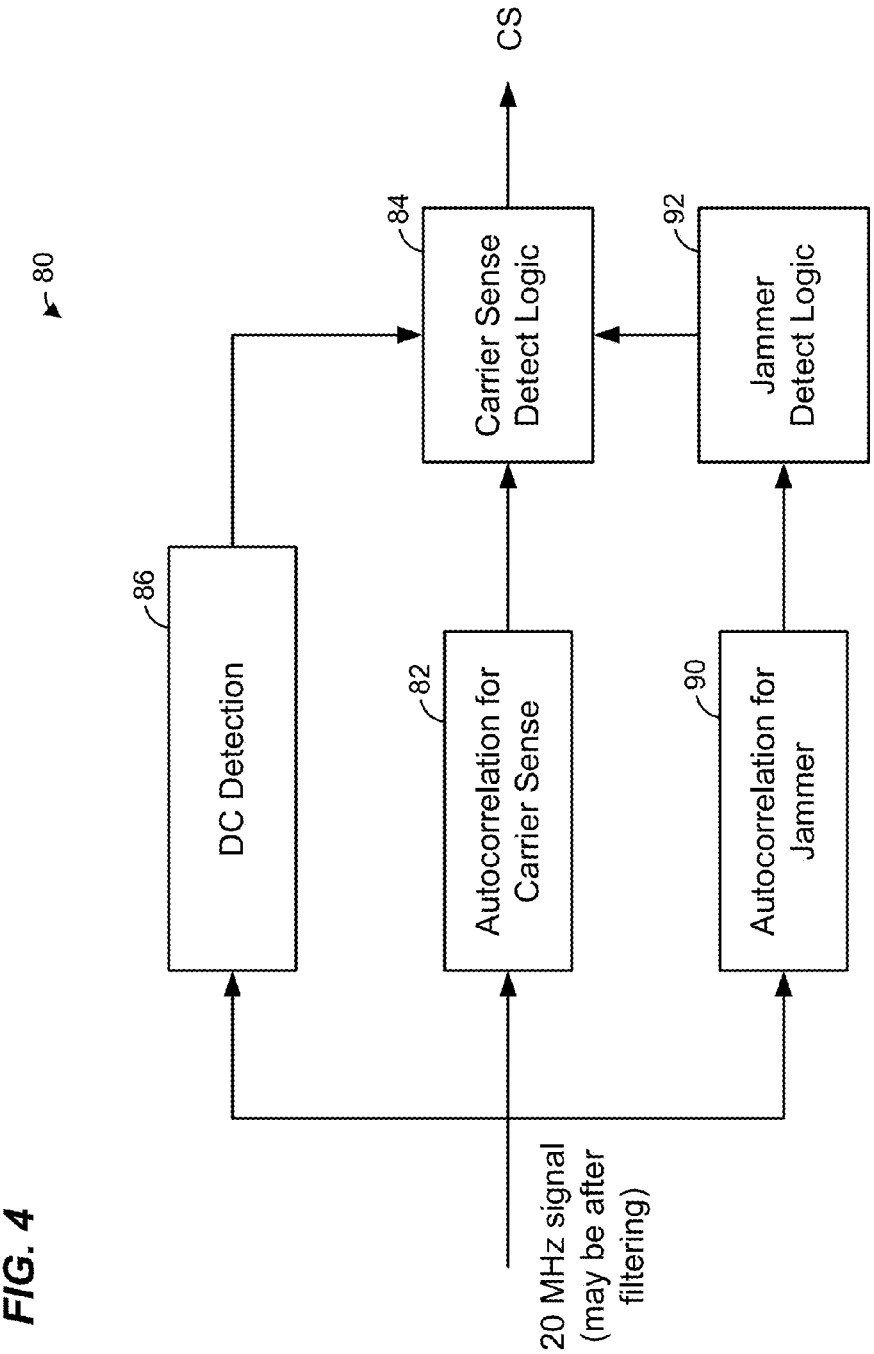
FIG. 4 is a block diagram of a prior art carrier sense architecture that includes direct current (DC) and jammer detection.

In some scenarios, a narrowband interferer (a "jammer") or a direct current (DC) offset signal may cause a false trigger of the autocorrelation-based carrier sense. To prevent this from occurring, the carrier sense architecture 80 of FIG. 4 is typically used, which detects DC signals and jammer signals in parallel with carrier sense detection. To this end, the architecture 80 includes not only an autocorrelation unit 82 and carrier sense logic 84 (similar to autocorrelation unit 64 or 72 and carrier sense logic 66 or 74 of FIG. 3B, respectively), but also a DC detection unit 86, a jammer autocorrelation unit 90, and jammer detection logic 92. The jammer autocorrelation unit 90 utilizes a different periodicity than the 16-sample period of the autocorrelation unit 82 for carrier sense. If DC detection unit 86 detects a DC signal, or if jammer detection logic 92 detects a jammer signal, carrier sensing is blocked (i.e., the output "CS" of the carrier sense logic 84 indicates that no packet has been detected). The input to the architecture 80 is a 20 MHz signal, which may be after FIR filtering. If the receiver is configured to handle channel bandwidths wider than 20 MHz (i.e., composite channels), the architecture 80 is repeated in each 20 MHz sub band.

As noted above, the conventional architectures described above with reference to FIGS. 1-4 do not utilize coherent combining or error control coding for carrier sense and symbol timing, and therefore lack coding gain and coherent combining gain. In a conventional device with multiple receive antennas, for example, the composite autocorrelation output used for carrier sense and symbol timing is:

$$AC(n) = \sum_{i=0}^{N_R-1} AC_i(n) \qquad \text{Equation 1}$$

where n is the sample number of the autocorrelation outputs, $AC(n)$ is the composite autocorrelation output, $N_R$ is the total number of samples in each autocorrelation output, and $AC_i(n)$ is the autocorrelation output corresponding to the $i^{th}$ receive antenna. While summing the individual autocorrelation outputs according to Equation 1 provides a small amount of noise reduction, the sensitivity gain is less than that achievable with coherent combining. Conversely, and as also noted above, multi-antenna coherent combining and error control coding are typically used for SIG and data fields, which improves SIG field and data decoding reliability, and allows successful SIG field and data decoding at lower SNRs. Consequently, carrier sense and symbol timing achieve less sensitivity/reliability than SIG field and data decoding, and can become the bottleneck of the overall receiver sensitivity. The problem is exacerbated when transmitting beamformed packets under IEEE 802.11n, and/or when using advanced data receiving technologies (e.g., for better channel estimation) to further improve SIG/data (but not STF) receiving sensitivity. In the case of beamformed packets, for example, the IEEE 802.11n standard specifies that the first, legacy preamble portion of a mixed-mode packet is not to be beamformed for omni transmission, which gives rise to an even larger reliability gap between carrier sense/symbol timing and SIG/data field demodulation and decoding.

The techniques and architectures described below with reference to FIGS. 5-15 reduce noise and improve SNR sensitivity during reception of an STF (or, more generally, during reception of any preamble field that includes a periodically repeating sequence). As a result, sensitivity bottlenecks caused by carrier sensing and/or symbol timing may be ameliorated, or even removed entirely.

Figure 5:
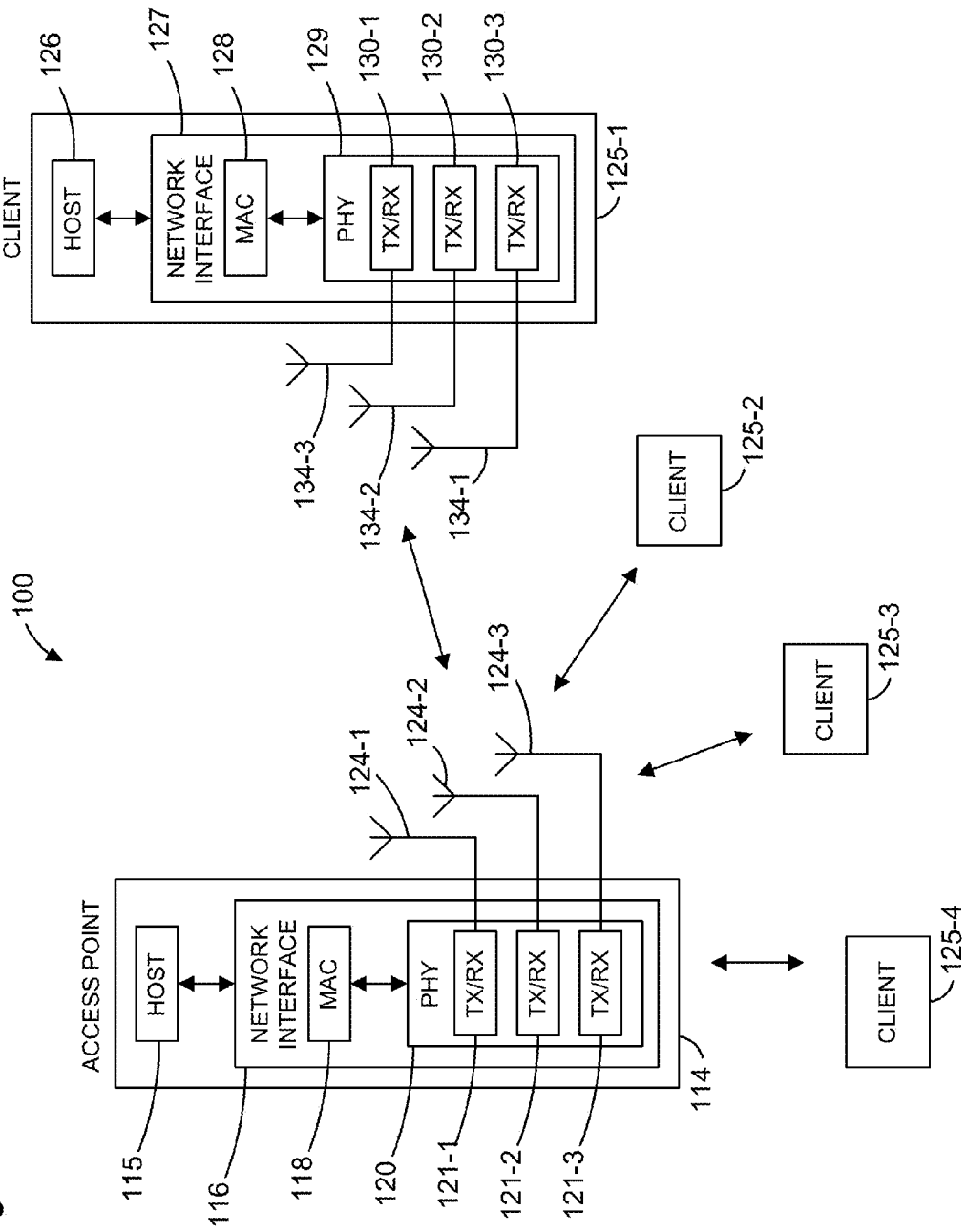
FIG. 5 is a block diagram of an example wireless local area network (WLAN) that implements improved carrier sense and/or symbol timing techniques, according to an embodiment.

FIG. 5 is a block diagram of an example WLAN 100 that implements improved carrier sense and/or symbol timing techniques of the present disclosure, according to an embodiment. An AP 114 includes a host processor 115 coupled to a network interface 116. The network interface 116 includes a media access control (MAC) unit 118 and a PHY unit 120. The PHY unit 120 includes a plurality of transceivers 121, and the transceivers are coupled to a plurality of antennas 124. Although three transceivers 121 and three antennas 124 are illustrated in FIG. 5, the AP 114 can include different numbers (e.g., one, two, four, five, etc.) of transceivers 121 and antennas 124 in other embodiments.

The WLAN 100 also includes a plurality of client stations 125. Although four client stations 125 are illustrated in FIG. 5, the WLAN 100 can include different numbers (e.g., one, two, three, five, six, etc.) of client stations 125 in various scenarios and embodiments. The client station 125-1 includes a host processor 126 coupled to a network interface 127. The network interface 127 includes a MAC unit 128 and a PHY unit 129. The PHY unit 129 includes a plurality of transceivers 130, and the transceivers 130 are coupled to a plurality of antennas 134. Although three transceivers 130 and three antennas 134 are illustrated in FIG. 5, the client station 125-1 can include different numbers (e.g., one, two, four, five, etc.) of transceivers 130 and antennas 134 in other embodiments. In an embodiment, one, two, or three of the client stations 125-2, 125-3, and 125-4 have a structure the same as or similar to the client station 125-1. In these embodiments, the client stations 125 are structured the same as or similar to the client station 125-1 and have the same or a different number of transceivers and antennas. For example, the client station 125-2 has only two transceivers and two antennas, in an embodiment.

The PHY unit 120 of the AP 114 is configured to operate according to one or more communication protocols. At least one of the communication protocols specifies a data unit that includes a preamble containing a periodically repeating sequence. In some embodiments, the field with the periodically repeating sequence is the first field of the data unit preamble. For example, in some embodiments (e.g., where the communication protocol is an IEEE 802.11a, 802.11n, 802.11ac, 802.11af, or 802.11ah protocol), the field is an STF with a periodically repeating sequence.

The transceiver(s) 121 of the AP 114 is/are configured to transmit the generated data units via the antenna(s) 124. Similarly, the transceiver(s) 121 is/are configured to receive similar data units via the antenna(s) 124. In various embodiments, the PHY unit 120 of the AP 114 is further configured to process received data units (e.g., data units that conform to any of the one or more communication protocols that the PHY unit 120 supports for transmission).

Similarly, the PHY unit 129 of the client station 125-1 is configured to operate according to one or more communication protocols, including at least the communication protocol of AP 114 that specifies a data unit with a preamble containing a periodically repeating sequence. The transceiver(s) 130 is/are configured to transmit generated data units via the antenna(s) 134. Similarly, the transceiver(s) 130 is/are configured to receive data units via the antenna(s) 234. The PHY unit 129 of the client station 125-1 is further configured to process received data units (e.g., data units that conform to any of the one or more communication protocols that the PHY unit 129 supports for transmission).

Similar to client station 125-1, each of client stations 125-2, 125-3, and 125-4 is configured to operate according to one or more communication protocols, at least one of which is used by AP 114. In some scenarios, some or all of client stations 125-2, 125-3, and 125-4 are configured to operate according to the same communication protocol(s) as client station 125-1.

Figure 6:
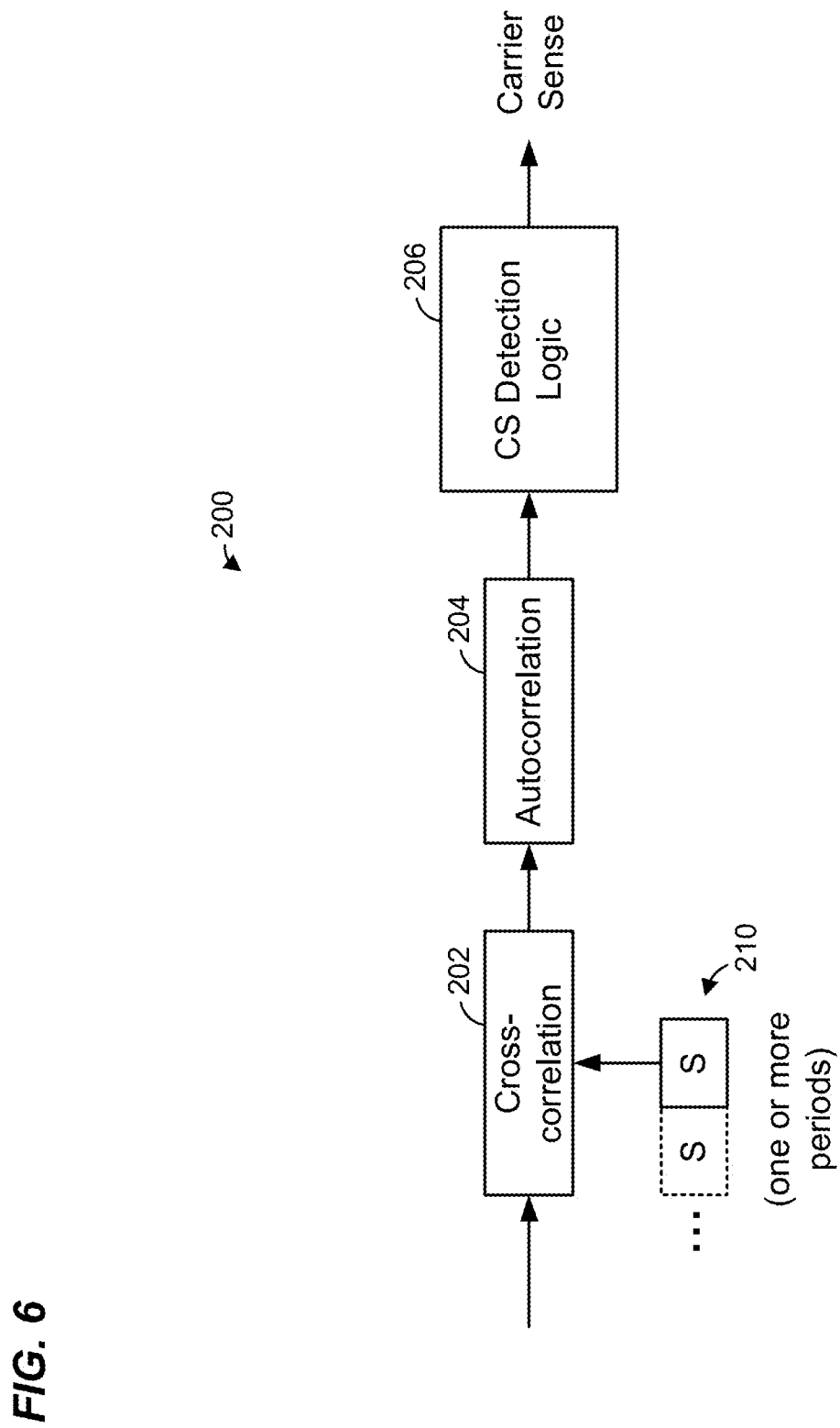
FIG. 6 is a block diagram of an example carrier sense architecture, according to an embodiment.

FIG. 6 is a block diagram of an example carrier sense architecture 200, according to an embodiment. The carrier sense architecture 200 is included in a receiver, such as a receiver within transceiver 121-1 of AP 114 or transceiver 130-1 of client station 125-1 in FIG. 5, for example. The example architecture 200 includes a cross-correlation unit 202, an autocorrelation unit 204 coupled to the output of the cross-correlation unit 202, and a carrier sense logic unit 206 coupled to the output of the autocorrelation unit 204. In various embodiments, additional units or stages (not seen in FIG. 6) are included between the cross-correlation unit 202 and the autocorrelation unit 204, and/or between the autocorrelation unit 204 and the carrier sense logic unit 206.

The example architecture 200 receives a signal that is input to the cross-correlation unit 202. In some scenarios, the received signal includes only noise and/or interference (e.g., AWGN, a narrowband interferer, etc.). In other scenarios, however, the received signal includes a packet intended for the device that includes the receiver with architecture 200. In various embodiments and scenarios, the received signal is a 20 MHz signal, such as a packet transmitted via a single channel in an IEEE 802.11a, 802.11n, or 802.11ac system, or a subband of a packet transmitted via a composite (e.g., 40 MHz) channel, for example.

In the example architecture 200, the cross-correlation unit 202 correlates the received signal with a set 210 of one or more periods/repetitions of the sequence S, where S is a known, periodically repeating sequence in the preamble of each packet. For example, in one embodiment where received packets conform to the IEEE 802.11a standard protocol, the sequence S is the sequence that is repeated 10 times in the STF of the packet preamble. In one embodiment, the sequence set 210 includes only one sequence S. In another embodiment, the sequence set 210 includes the same number of periodic repetitions of S as is specified to be included in the preamble of received packets (e.g., 10 repetitions). In other embodiments, a different, suitable number of repetitions of S is included in the sequence set 210. In embodiments where packets include an STF as specified in the IEEE 802.11a, 802.11n, or 802.11ac standards, the frequency domain STF and the corresponding time domain sequence S are as follows:

$$STF_{freq}(\text{tones } -26{:}26) = \text{sqrt}(\tfrac{1}{2})*[0,0,1+j,0,0,0,-1-j,0,$$
$$0,0,1+j,0,0,0,-1-j,0,0,0,-1-j,0,0,0,1+j,0,0,0,0,0,$$
$$0,0,-1-j,0,0,0,-1-j,0,0,0,1+j,0,0,0,1+j,0,0,0,1+j,$$
$$0,0,0,1+j,0,0] \quad \text{Equation 2}$$

$$S=[(0.1768+0.1768i)(-0.5090+0.0090i)(-0.0518-$$
$$0.3018i)(0.5486-0.0486i)(0.3536)(0.5486-$$
$$0.0486i)(-0.0518-0.3018i)(-0.5090+0.0090i)$$
$$(0.1768+0.1768i)(0.0090-0.5090i)(-0.3018-$$
$$0.0518i)(-0.0486+0.5486i)(0+0.3536i)(-0.0486+$$
$$0.5486i)(-0.3018-0.0518i)(0.0090-0.5090i)] \quad \text{Equation 3}$$

The output of the cross-correlation unit 202 is provided to the autocorrelation unit 204, which correlates the cross-correlation output signal with itself. The output of the autocorrelation unit 204 is then provided to the carrier sense logic unit 206, which processes the autocorrelation output signal to generate a carrier sense signal indicating whether a packet has been detected. For example, in an embodiment, the carrier sense logic unit 206 detects whether a "strong" autocorrelation exists (e.g., whether the autocorrelation output signal rises above a suitable, predetermined threshold, in an embodiment). In an embodiment, the autocorrelation output signal is also provided to a symbol timing unit that determines symbol timing by detecting a falling edge of the autocorrelation output signal. In one alternative embodiment, the autocorrelation output signal is used only to determine symbol timing, and the carrier sense logic unit 206 is omitted from the example architecture 200.

Figure 7:
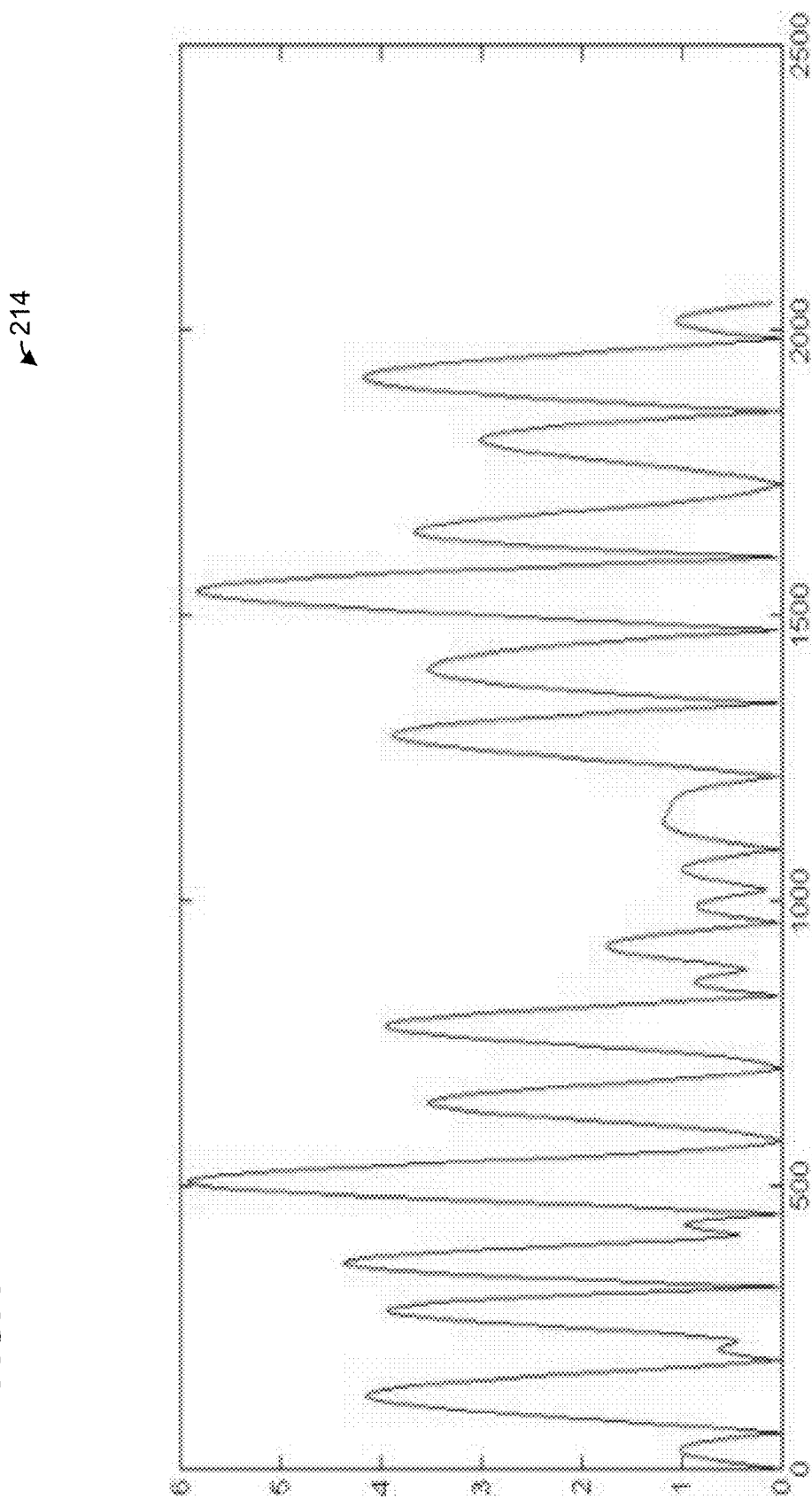
FIG. 7 illustrates a frequency response of a cross-correlator in an example carrier sense architecture, according to an embodiment.

The cross-correlation performed by the cross-correlation unit 202 is equivalent to coherent combining in the time domain, in an embodiment, and therefore improves the SNR of the received signal by suppressing noise. In one embodiment where the sequence set 210 includes only a single repetition of S, the processing gain incurred by the cross-correlation is roughly $10*\log 10(16) = 12$ dB. Generally, a larger number of repetitions in the sequence set 210 provides greater noise suppression at the output of the cross-correlation unit 202, and therefore greater processing gain. FIG. 7 illustrates an example frequency response 214 of a cross-correlation with the sequence S (e.g., a cross-correlation performed by the cross-correlation unit 202), according to an embodiment. As seen in the example frequency response 214, the cross-correlation with S is equivalent to a bandpass filter having a frequency response that is obtained by convolving impulses corresponding to the non-zero tones of an STF (e.g., as seen in Equation 2 above) with a sinc function. The convolution with the sinc function results from cross-correlating with only a windowed portion of the STF of a received packet. In an embodiment where the cross-correlation unit 202 cross-correlates with the entire STF sequence, the frequency response of the cross-correlation includes impulses only in the non-zero STF tones, without a sinc function convolution.

FIG. 8A illustrates an example output signal 220 generated by a cross-correlation unit 222 similar to the cross-correlation unit 202 of the carrier sense architecture 200 in FIG. 6, according to an embodiment. In FIG. 8A, the sequence set 224 represents the repetitions of the sequence S within a received signal corresponding to the STF of a received data unit, and the sequence set 226 represents the one or more repetitions of S with which the received signal is correlated. The example cross-correlation output signal 220 corresponds to an embodiment in which each repetition of S includes 16 samples, and in which the packet is received via an AWGN channel without delay. As seen in the example embodiment of FIG. 8A, the cross-correlation unit outputs a "high" level every $16^{th}$ sample, with noise being suppressed at the intervening samples. Whereas FIG. 8A illustrates an example cross-correlation output signal 220 in the presence of an AWGN channel, FIG. 8B illustrates an example cross-correlation output signal 230 in the presence of a delay channel, according to an embodiment. As seen in FIG. 8B, the example cross-correlation output signal 230 includes delay components in addition to the peaks at every $16^{th}$ sample. As seen in FIGS. 8A and 8B, the cross-correlation output signals 220, 230 remain periodic with respect to the 16-sample length of the sequence S, even in the presence of a delay channel. This property allows a 16-sample autocorrelation to be performed on the cross-correlation output signal (e.g., using the autocorrelation unit 204 of FIG. 6).

Figure 9A:
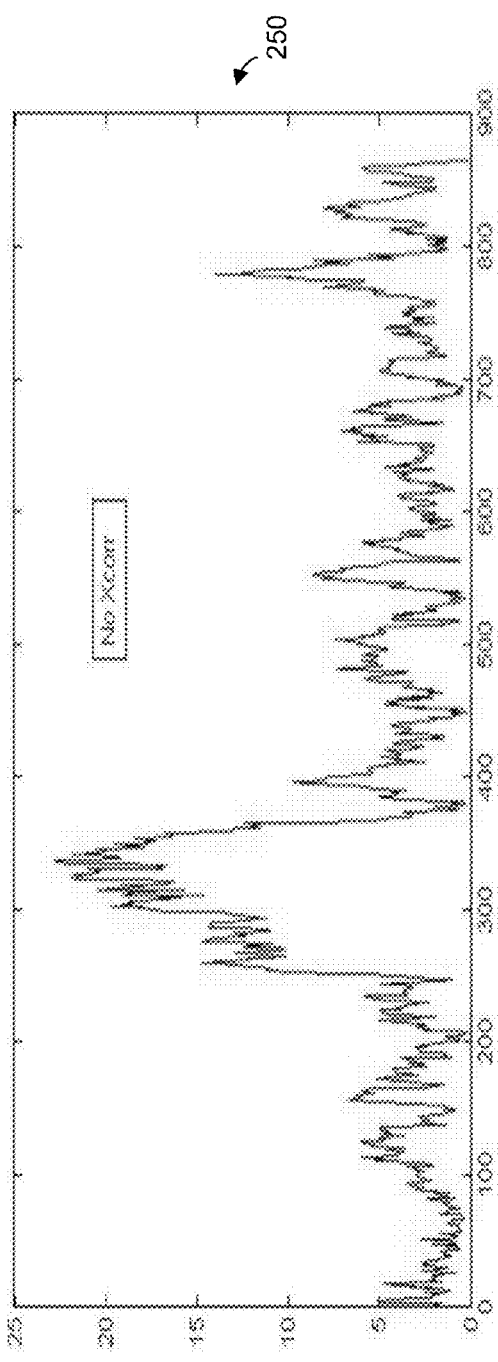
FIGS. 9A and 9B illustrate example autocorrelation output signals generated by different carrier sense architectures, without cross-correlation prior to the autocorrelation and with cross-correlation prior to the autocorrelation, respectively.
Figure 9B:
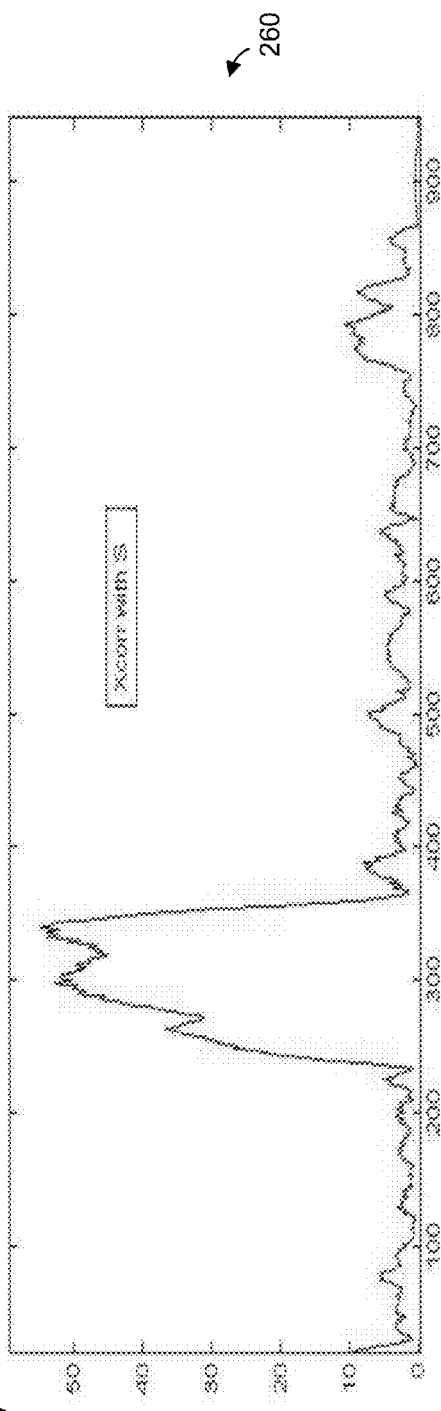

FIGS. 9A and 9B illustrate example autocorrelation output signals 250, 260 generated by different carrier sense architectures. Specifically, the autocorrelation output signal 250 of FIG. 9A corresponds to an autocorrelation performed on a received signal without any cross-correlation (e.g., in a prior art carrier sense architecture), and the autocorrelation output signal 260 of FIG. 9B corresponds to an autocorrelation performed after cross-correlating the portion of a received signal corresponding to an STF with repetitions of the known, periodically repeating STF sequence S (e.g., in the carrier sense architecture 200 of FIG. 6). Both output signals 250, 260 correspond to a scenario in which the communication channel is a delay channel with an SNR of 0 dB. As seen in the example output signals 250, 260, performing a cross-correlation prior to the autocorrelation substantially improves (suppresses) the noise in the autocorrelation output signal.

In some embodiments, the cross-correlation (e.g., performed by cross-correlation unit 202 of FIG. 6) is an "angle" cross-correlation, which performs angle additions rather than the multiplications of a non-angle cross-correlator. Angle correlation generally allows for simpler hardware designs, and removes the effect of automatic gain control (AGC) changes at the beginning of a packet. Without an angle correlator, the cross-correlation output signal when correlating a received signal y with the sequence S (including samples s(i)) can be expressed as follows:

$$XC(n) = \alpha \sum_{i=0}^{15} y(n+i) s^*(i) \quad \text{Equation 4}$$

where $\alpha$ is a scaling factor. With an angle correlator, phase information $\phi(n)$ is first determined (e.g., using a phase detector), and the phase information and cross-correlation output signal can be expressed as follows:

$$\phi(n) = \sum_{i=0}^{15} [\theta_y(n+i) - \theta_s(i)] \quad \text{Equation 5}$$

$$XC(n) = \alpha \cdot PSK\_MAP(\phi(n)) \quad \text{Equation 6}$$

where PSK_MAP is a mapping function that maps a phase to a complex value with unit magnitude and the phase being equal to $\phi(n)$. In an embodiment, the angle cross-correlator (e.g., cross-correlator unit 202 in FIG. 6) is followed by an angle autocorrelator (e.g., autocorrelator unit 204 in FIG. 6).

Figure 10:
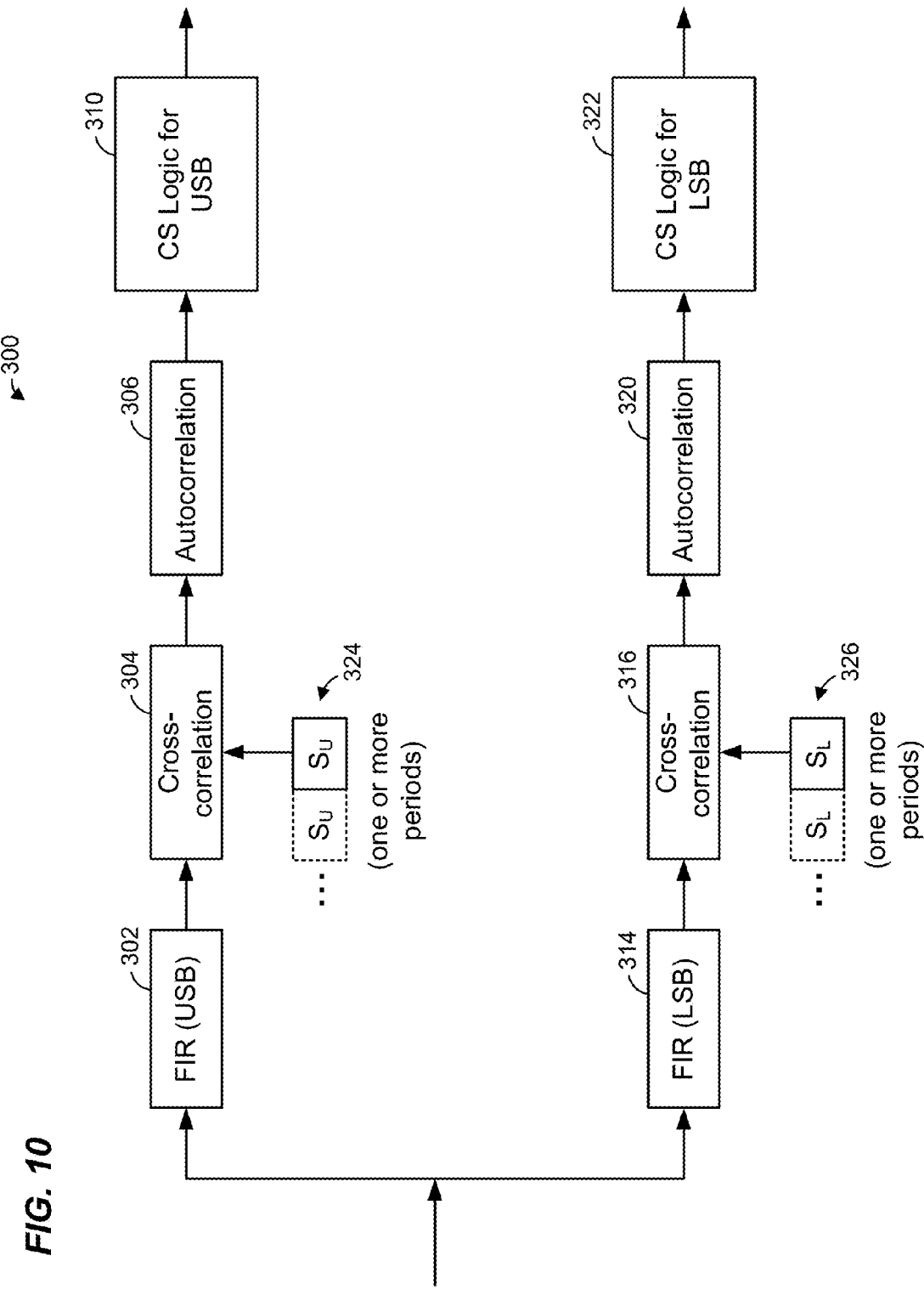
FIG. 10 is a block diagram of an example carrier sense architecture for receiving data units with a short training field (STF) replicated in upper and lower sidebands of a communication channel, according to an embodiment.

FIG. 10 is a block diagram of an example carrier sense architecture 300 for receiving data units with an STF replicated in upper and lower sidebands of a communication channel, according to an embodiment. The carrier sense architecture 300 is included in a receiver, such as a receiver within transceiver 121-1 of AP 114 or transceiver 130-1 of client station 125-1 in FIG. 5, for example. The example architecture 300 includes one path for each subband in which an STF is replicated for a received packet. For example, in an embodiment and scenario where the architecture 300 receives a 40 MHz IEEE 802.11n or 802.11ac signal, each path in the architecture 300 corresponds to a 20 MHz subband of the 40 MHz channel. A first path of the example architecture 300 includes a FIR filter 302, a cross-correlation unit 304 coupled to the output of the FIR filter 302, an autocorrelation unit 306 coupled to the output of the cross-correlation unit 304, and a carrier sense logic unit 310 coupled to the output of the autocorrelation unit 306. Similarly, a second path of the example architecture 300 includes a FIR filter 314, a cross-correlation unit 316 coupled to the output of the FIR filter 314, an autocorrelation unit 320 coupled to the output of the cross-correlation unit 316, and a carrier sense logic unit 322 coupled to the output of the autocorrelation unit 316. In some embodiments, the first and/or second paths include additional units or stages not seen in FIG. 10. For example, in some embodiments, each path includes a DC detection logic unit and/or jammer detection logic unit, for detecting DC and jammer signals of the sort discussed above with reference to FIG. 4.

In the first path, the FIR filter 302 is designed to pass the upper sideband of the received signal (e.g., the upper 20 MHz of a 40 MHz signal) while attenuating the lower sideband of the received signal. (e.g., the lower 20 MHz), in an embodiment. In the example embodiment of FIG. 10, the cross-correlation unit 304 correlates the output of the FIR filter 302 with a set 324 of one or more repetitions of a sequence $S_U$. The sequence $S_U$ corresponds to the time domain sequence of the periodically replicated STF sequence S in the upper sideband of the received signal. In various embodiments, the sequence set 324 includes one repetition of $S_U$, a number of repetitions of $S_U$ that is equal to the number of repetitions specified for the STF of each packet, or another suitable number of repetitions of $S_U$. In an embodiment, each repetition of $S_U$ has a length corresponding to the sampling rate used after the FIR filter 302. For example, each repetition of $S_U$ has a length of 16 or 32 samples depending on the sampling rate used after the FIR filter 302, in an embodiment.

The autocorrelation unit 306 correlates the output of the cross-correlation unit 304 with itself (e.g., 16 samples of the cross-correlation output signal with the next 16 samples of the cross-correlation output), in an embodiment. Next, the carrier sense logic unit 310 determines whether a packet has been detected in the upper sideband of the communication channel. The cross-correlation unit 304, autocorrelation unit 306, and carrier sense logic 310 are similar to the cross-correlation unit 202, autocorrelation unit 204, and carrier sense logic 206, respectively, of FIG. 6, in an embodiment. In an embodiment, one or both of cross-correlation unit 304 and autocorrelation unit 306 is/are angle correlation units.

In the second path, the FIR filter 314 is designed to pass the lower sideband of the received signal (e.g., the lower 20 MHz of a 40 MHz signal) while attenuating the upper sideband of the received signal. (e.g., the upper 20 MHz), in an embodiment. In the example embodiment of FIG. 10, the cross-correlation unit 316 correlates the output of the FIR filter 314 with a set 326 of one or more repetitions of a sequence $S_L$. The sequence $S_L$ corresponds to the time domain sequence of the periodically replicated STF sequence S in the lower sideband of the received signal. In various embodiments, the sequence set 326 includes one repetition of $S_L$, a number of repetitions of $S_L$ that is equal to the number of repetitions specified for the STF of each packet, or another suitable number of repetitions of $S_L$. In an embodiment, each repetition of $S_L$ has a length corresponding to the sampling rate used after the FIR filter 314. For example, each repetition of $S_L$ has a length of 16 or 32 samples depending on the sampling rate used after the FIR filter 314, in an embodiment.

Figure 11:
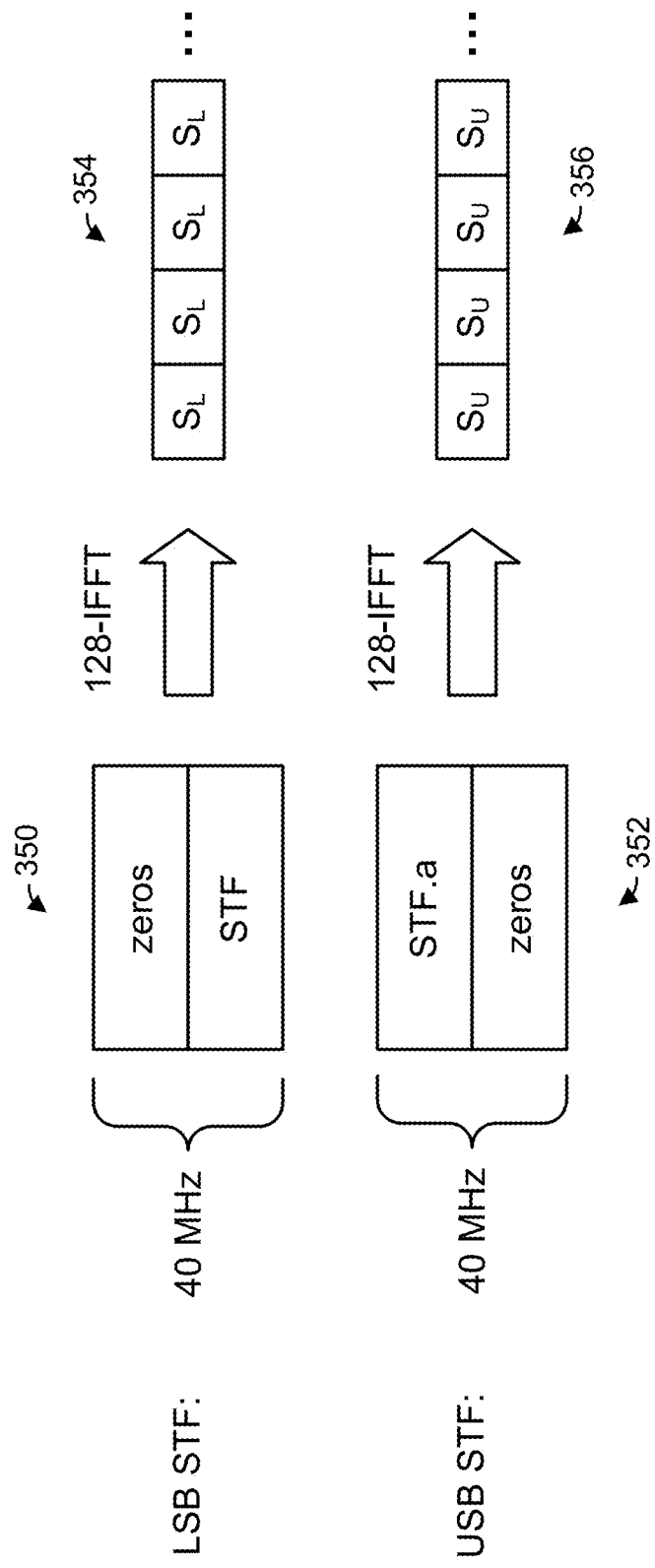
FIG. 11 is a diagram of frequency and time domain representations of periodically repeating sequences of an example STF replicated in lower and upper sidebands of a communication channel, according to an embodiment.

In an embodiment, the repetitions of $S_L$ and $S_U$ in the lower and upper sidebands of a received packet correspond to the same frequency domain signal in 20 MHz, but different time domain signals. Moreover, in an embodiment, the same 20 MHz frequency domain signal is located at upper and lower 20 MHz subbands of the 40 MHz band, and a different phase shift is applied to the repetitions of $S_L$ and the repetitions of $S_U$ in a received packet. FIG. 11 is a diagram of frequency domain representations 350, 352 and corresponding time domain representations 354, 356 of periodically repeating sequences of an example STF replicated in lower and upper sidebands of a communication channel, according to an embodiment in which a packet is received via a composite 40 MHz channel formed from two 20 MHz subbands. As seen in FIG. 11, the upper sideband frequency domain representation 352 includes an STF that is multiplied by a phase shift factor α.

Referring again to FIG. 10, the autocorrelation unit 320 correlates the output of the cross-correlation unit 316 with itself, in an embodiment. Next, the carrier sense logic unit 322 determines whether a packet has been detected in the lower sideband of the communication channel. The cross-correlation unit 316, autocorrelation unit 320, and carrier sense logic 322 are similar to the cross-correlation unit 202, autocorrelation unit 204, and carrier sense logic 206, respectively, of FIG. 6, in an embodiment. In some embodiments, one or both of cross-correlation unit 316 and autocorrelation unit 320 is/are angle correlation units.

In some embodiments and scenarios where signals are received via larger composite channels, with the STF replicated in each of more than two subbands (e.g., four subbands, eight subbands, etc.), the example architecture 300 includes additional paths similar to the first and second path. For example, in one embodiment, the architecture 300 includes four paths corresponding to four subbands of the composite channel, where each path includes an FIR filter (similar to FIR filters 302, 314) that passes the corresponding subband, a cross-correlation unit (similar to cross-correlation units 304, 316) that correlates the received, filtered signal with a suitable sequence set, an autocorrelation unit (similar to autocorrelation units 306, 320), and a carrier sense logic unit (similar to carrier sense logic units 310, 322).

In one embodiment where composite channels formed from multiple subbands include a primary channel/subband and one or more secondary channels/subbands, the output of the carrier sense logic unit (e.g., unit 310 or unit 322) that corresponds to the primary channel/subband is given more weight, and/or symbol timing is determined based on the autocorrelation for the primary channel/subband. For example, in an embodiment and scenario where the lower sideband of a 40 MHz signal corresponds to the primary channel and the upper sideband of the 40 MHz signal corresponds to the secondary channel, the output of the carrier sense logic 322 is given more weight than the output of the carrier sense logic 310, and/or symbol timing is determined based on the output of the autocorrelation unit 320 rather than the output of autocorrelation unit 306.

In some embodiments, the cross-correlations performed by cross-correlation unit 304 and cross-correlation unit 316 have frequency responses with impulses in the upper sideband and lower sideband, respectively, corresponding to the non-zero tones of the STF. In other embodiments (e.g., where each cross-correlation does not correlate with the entire length of the STF), the frequency response is equal to the impulses convolved with a sinc function. In either of these embodiments, the cross-correlation operation can itself partially suppress the signal in the other subband(s). For example, in the architecture 300, the cross-correlation unit 304 performs a cross-correlation that partially suppresses the lower sideband, and the cross-correlation unit 316 performs a cross-correlation that partially suppresses the upper sideband. If this level of suppression is sufficient, FIR filtering may not be needed prior to each cross-correlation. Thus, in an embodiment, the FIR filter 302 and the FIR filter 314 are omitted from the example architecture 300.

Figure 12A:
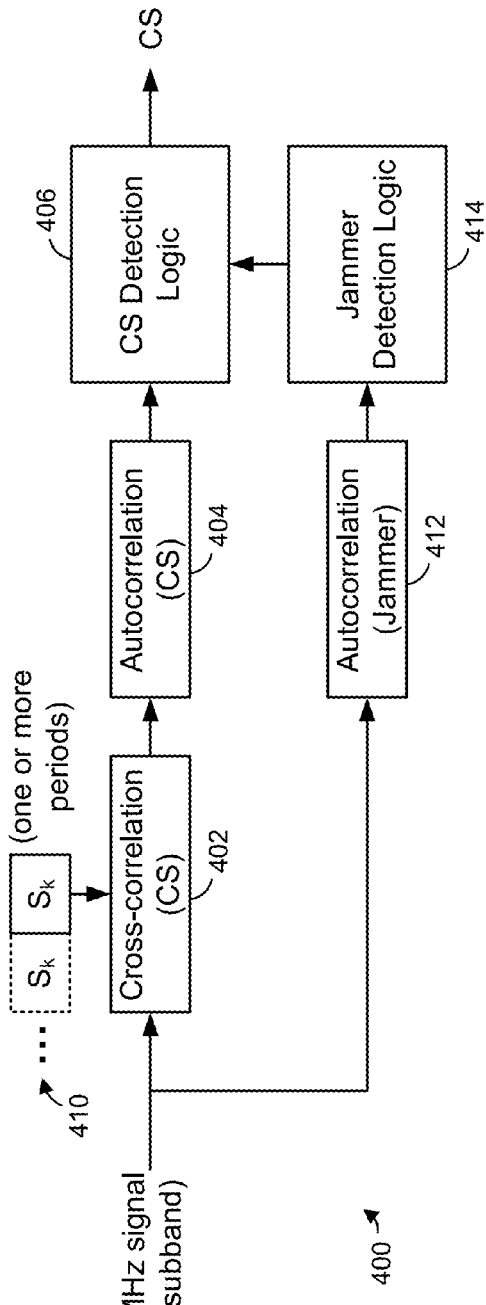
FIGS. 12A and 12B are block diagrams of example carrier sense architectures that include jammer detection, according to different embodiments.
Figure 12B:
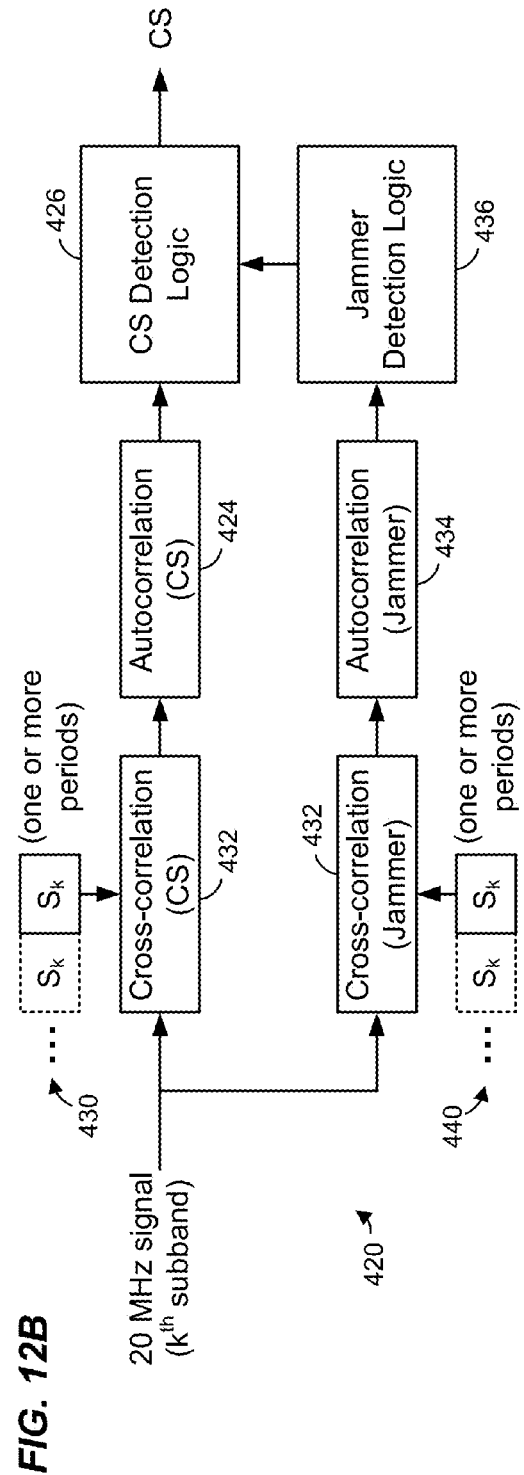

Further, the cross-correlation operations of cross-correlation units 304, 316 may partially suppress DC signals and/or jammer signals. Accordingly, in some embodiments, the carrier sense architecture 300 does not provide any DC detection and/or jammer detection functionality. In some embodiments, however, the cross-correlation operations do not sufficiently suppress jammer signals, and/or jammer detection is used by the receiver for other (non-carrier sense) purposes. Thus, in some embodiments, the example architecture 300 includes one or more units configured to detect jammer signals. FIGS. 12A and 12B are block diagrams of example carrier sense architectures 400 and 420, respectively, that provide jammer detection, according to two different embodiments. Carrier sense architectures 400 and 420 are included in receivers, such as a receiver within transceiver 121-1 of AP 114 or transceiver 130-1 of client station 125-1 in FIG. 5, for example.

Referring first to FIG. 12A, the example architecture 400 includes a cross-correlation unit 402, an autocorrelation unit 404 coupled to the output of the cross-correlation unit 402, and a carrier sense logic unit 406 coupled to the output of the autocorrelation unit 404. In some scenarios, the architecture 400 receives a signal that includes only noise and/or interference (e.g., AWGN, a narrowband interferer, etc.). In other scenarios, however, the received signal includes a packet that may be intended for the device that includes the receiver with architecture 400. In one embodiment and scenario, the received signal is a 20 MHz signal, such as a packet transmitted via a single channel in an IEEE 802.11a, 802.11n, or 802.11ac system, or a subband of a packet transmitted via a composite (e.g., 40 MHz, 80 MHz, etc.) channel, for example. In another embodiment and/or scenario (e.g., where the cross-correlation unit 402 is not preceded by an FIR filter), the received signal is a wider bandwidth signal (e.g., a signal spanning the entire bandwidth of a composite channel).

The cross-correlation unit 402 correlates the received signal with a set 410 of one or more periods of a sequence $S_k$, in an embodiment, where $S_k$ is a known, periodically repeating time domain sequence in the $k^{th}$ subband of the communication channel. The autocorrelation unit 404 and carrier sense logic unit 406 are similar to the autocorrelation unit 306 and carrier sense logic unit 310 of FIG. 10, respectively, in an embodiment.

In parallel with the cross-correlation unit 402 and autocorrelation unit 404 of the carrier sense path, a jammer autocorrelation unit 412 correlates the received signal with itself. A jammer detection logic unit 414 is coupled to the output of the jammer autocorrelation unit 412, and determines whether the output signal from the jammer autocorrelation unit 412 corresponds to the presence of a jammer signal. In one embodiment, the jammer detection logic unit 414 sends a signal to carrier sense logic unit 406 indicating whether a jammer signal has been detected, and the carrier sense logic unit 406 determines whether to indicate that a packet has been detected based on both the output of the autocorrelation unit 404 and the output of the jammer detection unit 414. In other embodiments (e.g., where the cross-correlation unit 402 sufficiently suppresses jammer signals, and jammer detection is not used for carrier sense), the output of the jammer detection logic unit 414 is instead provided to a unit different than carrier sense logic unit 406.

Unlike the architecture 400, the architecture 420 of FIG. 12B performs a cross-correlation operation prior to the autocorrelation in the jammer detection path. As a result, jammer signals are suppressed prior to the autocorrelation, which results in jammer detection being triggered only for relatively strong jammer signals, in an embodiment.

The architecture 420 receives signals similar to the signals received by the example architecture 400 of FIG. 12A, in some embodiments and scenarios. The carrier sense path of the example architecture 420 includes a cross-correlation unit 422, an autocorrelation unit 424 coupled to the output of the cross-correlation unit 422, and a carrier sense logic unit 426 coupled to the output of the autocorrelation unit 424. The cross-correlation unit 422 correlates the received signal with a set 430 of one or more periods of a sequence $S_k$, in an embodiment, where $S_k$ is a known, periodically repeating time domain sequence in the $k^{th}$ subband of the communication channel. The autocorrelation unit 424 and carrier sense logic unit 426 are similar to the autocorrelation unit 306 and carrier sense logic unit 310 of FIG. 10, respectively, in an embodiment.

In parallel with the cross-correlation unit 422 and autocorrelation unit 424 of the carrier sense path, a jammer cross-correlation unit 432 correlates the received signal with one or more periods of the sequence $S_k$, and a jammer autocorrelation unit 434 correlates the output signal from the jammer cross-correlation unit 432 with itself. In an alternative embodiment, the jammer cross-correlation unit 432 is omitted, and the output of the cross-correlation unit 422 from the carrier sense path is coupled to both the autocorrelation unit 424 in the carrier sense path and the jammer autocorrelation unit 434. A jammer detection logic unit 436 is coupled to the output of the jammer autocorrelation unit 434, and determines whether the output signal from the jammer autocorrelation unit 434 corresponds to the presence of a jammer signal. As with the example architecture 400 of FIG. 12A, the jammer detection logic unit 414 of the example architecture 420 provides an indication of the presence of a jammer signal to carrier sense logic unit 426, and/or to a different unit within the receiver.

In an embodiment, the example architectures 400, 420 of FIGS. 12A and 12B are duplicated in each of a plurality of paths, with each path corresponding to a subband of a composite channel (e.g., in a manner similar to the example architecture 300 of FIG. 10), and with the respective sequence $S_k$ being used for the cross-correlation in each path. For example, in one embodiment and scenario where a packet is received via a composite 80 MHz channel (formed from four 20 MHz subbands), the architecture 400 or the architecture 420 is duplicated to provide four parallel paths.

Figure 13A:
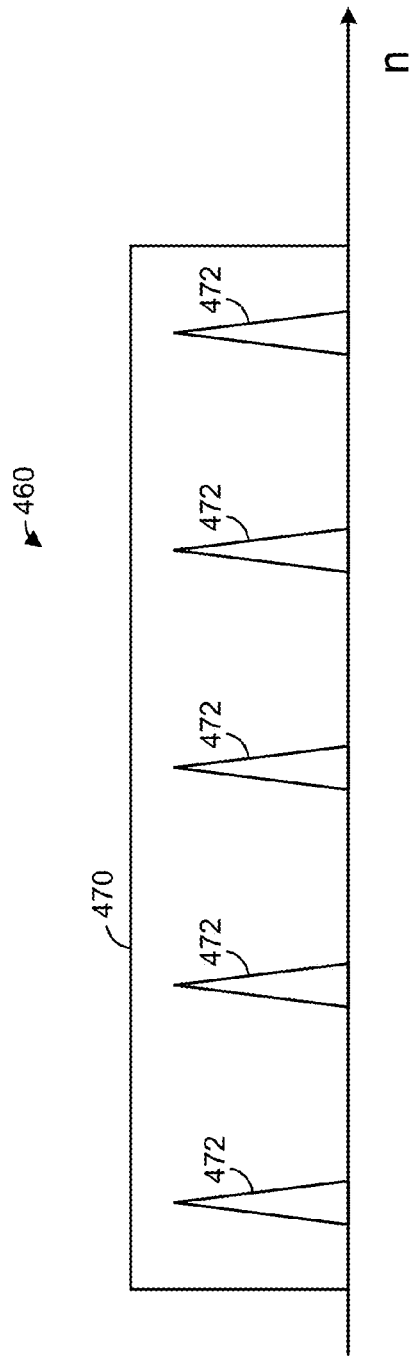
FIG. 13A is a diagram of an example autocorrelation operation, according to an embodiment.
Figure 13B:
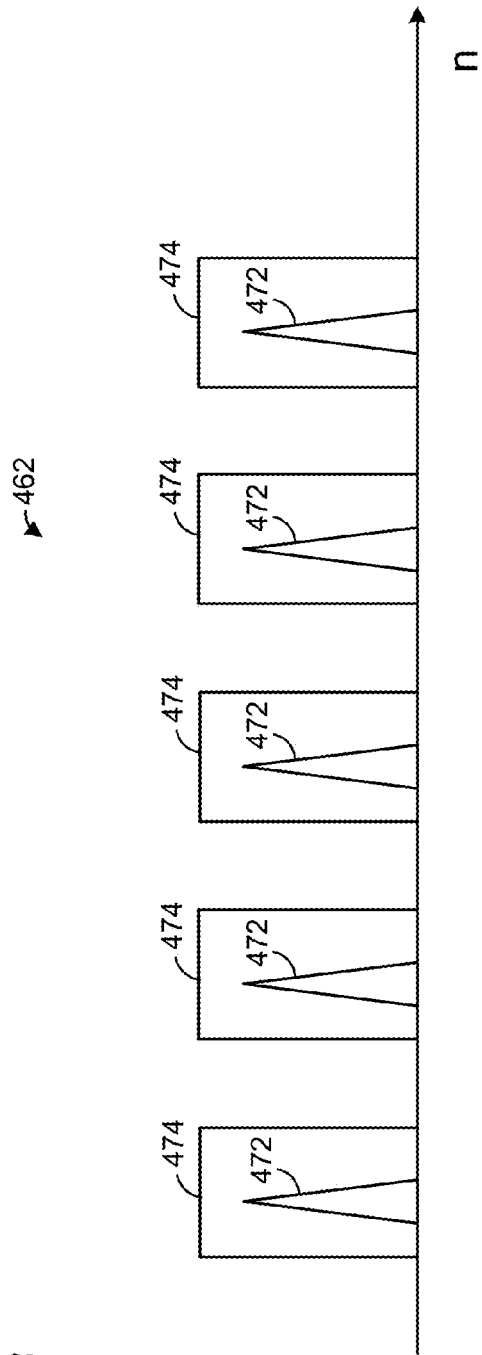
FIG. 13B is a diagram of an example windowed correlation operation, according to an embodiment.

In alternative embodiments, any of the autocorrelation units described above (e.g., autocorrelation unit 204 of FIG. 6, autocorrelation units 306, 320 of FIG. 10, autocorrelation unit 404 of FIG. 12A, or autocorrelation unit 412 of FIG. 12B) are instead windowed correlation units. Autocorrelation outputs and windowed correlation outputs (AutoCorr(n) and WindowCorr(n), respectively) can be expressed as:

$$AutoCorr(n) = \alpha \sum_{i=1}^{NT} XC(n+i) \cdot XC^*(n+i-T) \quad \text{Equation 7}$$

$$WindowCorr(n) = \beta \sum_{k=1}^{N} \sum_{i=kT+1}^{kT+M} XC(n+i) \cdot XC^*(n+i-T) \quad \text{Equation 8}$$

where α and β are normalization factors, T is the sequence period (e.g., 16 samples), and M is the window length in samples (where M<T). Windowed correlation generally further suppresses noise levels by performing time domain filtering, which may in turn improve packet detection. FIG. 13A is a diagram of an example autocorrelation operation 460, and FIG. 13B is a diagram of an example windowed correlation operation 462, according to different embodiments. As seen in FIGS. 13A and 13B, the example autocorrelation operation 460 is performed over a span 470 that covers all of the peaks 472 of the cross-correlation output signal, while the example windowed correlation operation 462 is performed over multiple, shorter time domain windows 474 that suppress noise between the peaks 472 of the cross-correlation output signal.

In some embodiments, any of the example carrier sense architectures described above with reference to FIGS. 6, 10, and 12 are implemented in communication devices that include multiple receive antennas. In some of these embodiments, the carrier sense architectures described above are duplicated for each receive antenna, and the output signals from the various carrier sense autocorrelation or windowed correlation units (each following a respective cross-correlation operation) are added together to improve the SNR. For example, in one embodiment and scenario where a composite 40 MHz signal (including two 20 MHz subbands) is received via multiple receive antennas, each of the receive antennas is coupled to a respective receive path that includes an architecture similar to the example architecture 300 of FIG. 10 (i.e., such that the receiver includes two carrier sense paths per receive antenna).

Figure 14:
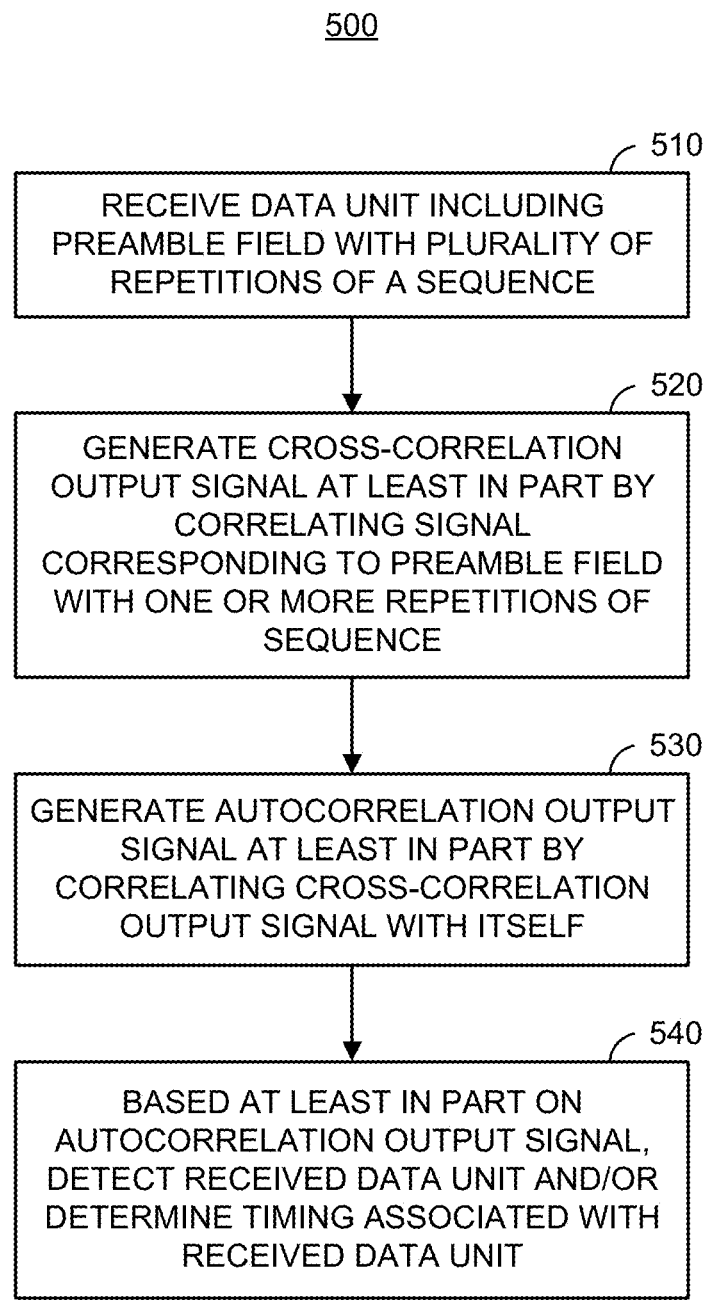
FIG. 14 is a flow diagram of an example method for processing a preamble of a data unit received via a communication channel, according to an embodiment.

FIG. 14 is a flow diagram of an example method 500 for processing a preamble of a data unit received via a communication channel, according to an embodiment. In various embodiments, the method 500 is performed by a network interface such as network interface 116 of AP 114 or network interface 127 of client station 125-1 in FIG. 5, for example.

At block 510, a data unit is received. The data unit includes a preamble with a preamble field that includes a plurality of repetitions of a sequence. In an embodiment, the repetitions of the sequence are periodically repeated (e.g., each fixed-length sequence in the plurality of sequences immediately follows the previous sequence in the field). In one embodiment, the preamble field is an STF of the received data unit. In some embodiments, the preamble of the received data unit also includes one or more other preamble fields, such as an LTF for channel estimation.

At block 520, a cross-correlation output signal is generated at least in part by correlating a signal corresponding to the preamble field of the data unit (received at block 510) with one or more repetitions of the known sequence of the preamble field. For example, in an embodiment where the preamble field is specified to include a plurality of sequences S, the signal corresponding to the preamble field of the received data unit is correlated with one or more repetitions of S. In various embodiments, the signal is correlated with one repetition of S, a number of repetitions of S equal to the number of repetitions specified as being included in the preamble field (e.g., according to an 802.11n standard, an 802.11ac standard, etc.), or a different, suitable number of repetitions of S. In an embodiment, the cross-correlation output signal is generated using an angle correlator.

At block 530, an autocorrelation output signal is generated at least in part by correlating the cross-correlation output signal generated at block 520 with itself. In some embodiments, the cross-correlation output signal is subject to some processing (e.g., filtering) prior to the autocorrelation at block 530. In other embodiments, the cross-correlation output signal is not processed prior to the autocorrelation at block 530. In an embodiment where the cross-correlation output signal is generated using an angle correlator, the autocorrelation output signal is also generated using an angle correlator. In an alternative embodiment, the correlation performed at block 530 is instead a windowed correlation, such as the windowed correlation seen in FIG. 13B, for example.

At block 540, the data unit received at block 510 is detected, and/or timing associated with the data unit is determined, based at least in part on the autocorrelation (or windowed correlation) output signal generated at block 530. For example, in one embodiment, the data unit is detected at least in part by detecting a rising edge in the autocorrelation output signal (e.g., when the autocorrelation output signal rises above a suitable, predetermined threshold). As another example, in an embodiment used in an OFDM system, OFDM symbol timing is determined at least in part by detecting a falling edge in the autocorrelation (or windowed correlation) output signal (e.g., when a "high" autocorrelation output signal falls below a suitable, predetermined threshold), and/or by detecting a boundary between the preamble field of the received data unit and another preamble field immediately following the preamble field (e.g., a boundary between an STF and LTF).

In some embodiments, the data unit can only be detected at block 540 if no jammer signals are detected. Additionally (or alternatively), in some embodiments, the data unit can only be detected at block 540 if no DC signal is detected. In some embodiments, a packet cannot be detected if either of a jammer signal or a DC signal is detected.

In some embodiments, the method 500 includes more or fewer blocks than are shown in FIG. 14. For example, in an embodiment, the method 500 does not include block 510 (e.g., the device or unit performing the method 500 does not receive the data unit via a communication channel, but instead obtains the data unit from another nearby device or unit). As another example, in one embodiment where detecting the received data unit includes determining that no jammer signals are present, the method 500 includes an additional block in which a jammer correlation (e.g., autocorrelation or windowed correlation) output signal is generated. Additionally, in one such embodiment, the method 500 includes a block in which a jammer cross-correlation output signal is generated. In this embodiment, the jammer correlation output signal is generated by performing a correlation operation (e.g., autocorrelation or windowed correlation) on the jammer cross-correlation output signal. In each of these embodiments (i.e., performing an autocorrelation or windowed correlation, with or without performing a cross-correlation, for jammer detection), detecting the absence of a jammer signal is based at least in part on the jammer correlation output signal.

Figure 15:
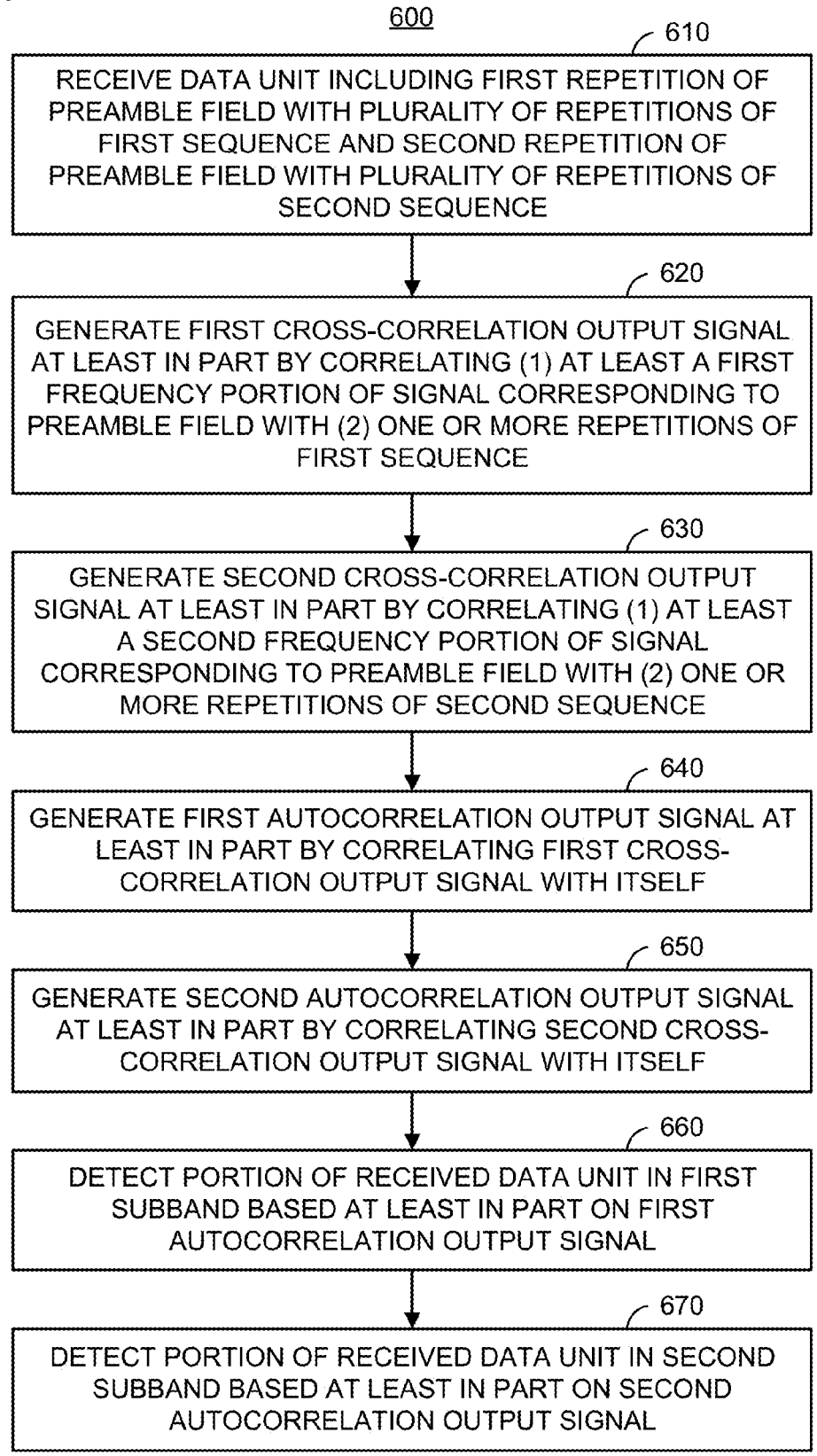
FIG. 15 is a flow diagram of an example method for processing a preamble of a data unit with a preamble field replicated in each of two or more subbands of a communication channel, according to an embodiment.

In some embodiments and/or scenarios, the method 500 is repeated (e.g., in parallel) for each of one or more subbands of a data unit received via a composite channel. FIG. 15 illustrates in more detail an example method 600 for such an embodiment and/or scenario. At block 610 of the method 600, a data unit is received via a composite communication channel. The data unit includes a preamble with a first repetition of a preamble field (e.g., of an STF) in a first subband of the communication channel, and a second repetition of the preamble field in a second subband of the communication channel, according to an embodiment. The first repetition of the preamble field includes a plurality of repetitions of a first sequence, and the second repetition of the preamble field includes a plurality of repetitions of a second sequence. In an embodiment, the first sequence and second sequence both correspond to the same frequency domain signal within each 20 MHz subband, but are different in the time domain. In some embodiments, the second repetition of the preamble field is phase shifted relative to the first repetition of the preamble field.

At block 620, a first cross-correlation output signal is generated at least in part by correlating at least a first frequency portion of a signal that corresponds to the preamble field of the data unit (received at block 610) with one or more repetitions of the first sequence. For example, in one embodiment, the first frequency portion is an upper sideband of the signal, and only the upper sideband of the signal is operated on at block 620. In other embodiments (e.g., where no FIR filter precedes the cross-correlation at block 620), the entire frequency span of the signal is operated on at block 620. In various embodiments, the first frequency portion of the signal is correlated with one repetition of the first sequence, a number of repetitions that is equal to the number of repetitions specified as being included in the preamble field (e.g., according to an 802.11n standard, an 802.11ac standard, etc.), or a different, suitable number of repetitions.

At block 630, a second cross-correlation output signal is generated at least in part by correlating at least a second frequency portion of the signal with one or more repetitions of the second sequence. For example, in one embodiment where the first frequency portion operated on at block 620 is an upper sideband of the signal, the second frequency portion is an lower sideband of the signal, and only the lower sideband of the signal is operated on at block 630. In other embodiments (e.g., where no FIR filter precedes the cross-correlation at block 620), the entire frequency span of the signal is operated on at block 630. In various embodiments, the second frequency portion of the signal is correlated with one repetition of the second sequence, a number of repetitions that is equal to the number of repetitions specified as being included in the preamble field, or a different, suitable number of repetitions. In an embodiment, the number of repetitions of the second sequence used for the cross-correlation at block 630 is the same as the number of repetitions of the first sequence used for the cross-correlation at block 620.

At block 640, a first autocorrelation output signal is generated, at least in part by correlating the first cross-correlation output signal (generated at block 620) with itself. In some embodiments, the first cross-correlation output signal is subject to some processing (e.g., filtering) prior to the autocorrelation at block 640. In other embodiments, the first cross-correlation output signal is not processed prior to the autocorrelation at block 640.

At block 650, a second autocorrelation output signal is generated, at least in part by correlating the second cross-correlation output signal (generated at block 630) with itself. In some embodiments, the second cross-correlation output signal is subject to some processing (e.g., filtering) prior to the autocorrelation at block 650. In other embodiments, the second cross-correlation output signal is not processed prior to the autocorrelation at block 650.

In some embodiments, the cross-correlations performed at blocks 620 and 630, and/or the autocorrelations performed at blocks 640 and 650, are performed using angle correlators. Moreover, in an alternative embodiment, the correlations performed at blocks 640 and 650 are instead windowed correlations, such as the windowed correlation seen in FIG. 13B, for example.

At block 660, a portion of the received data unit is detected in the first subband (corresponding to the first frequency portion of the signal), at least in part based on the first autocorrelation (or windowed correlation) output signal generated at block 640. In an embodiment, block 660 is similar to block 540 of method 500, except that only a portion of the received data unit that is received in the first subband (e.g., only an STF that is duplicated in an upper sideband of the received data unit) is detected.

At block 670, a portion of the received data unit is detected in the second subband (corresponding to the second frequency portion of the signal), at least in part based on the second autocorrelation (or windowed correlation) output signal generated at block 650. In an embodiment, block 670 is similar to block 540 of method 500, except that only a portion of the received data unit that is received in the second subband (e.g., only an STF that is duplicated in a lower sideband of the received data unit) is detected.

In some embodiments, the method 600 includes more or fewer blocks than are shown in FIG. 15. For example, in an embodiment, the method 600 does not include block 610 (e.g., the device or unit performing the method 600 does not receive the data unit via a communication channel, but instead obtains the data unit from another nearby device or unit). As another example, the method 600 includes additional blocks in embodiments where data unit detection in each subband also utilizes jammer detection. In one such embodiment, the method 600 additionally includes blocks in which a first jammer cross-correlation output signal is generated using one or more repetitions of the first sequence, a second jammer cross-correlation output signal is generated using one or more repetitions of the second sequence, a first jammer correlation output signal is generated at least in part by performing a correlation (e.g., autocorrelation or windowed correlation) using the first jammer cross-correlation output signal, and a second jammer correlation output signal is generated at least in part by performing a correlation (e.g., autocorrelation or windowed correlation) using the second jammer cross-correlation output signal. Moreover, in some of these embodiments, detecting a portion of the received data unit in the first subband (at block 660) includes detecting an absence of jammer signals in the first subband based at least in part on the first jammer correlation output signal, and detecting a portion of the received data unit in the second subband (at block 670) includes detecting an absence of jammer signals in the second subband based at least in part on the second jammer correlation output signal.

As yet another example, in an embodiment, the method 600 also includes a block in which symbol timing of the data unit (received at block 610) is determined, based on the first autocorrelation (or windowed correlation) output signal generated at block 640 and/or the second autocorrelation (or windowed correlation) output signal generated at block 650. In one embodiment, for example, the symbol timing is determined based on whichever autocorrelation or windowed correlation output signal corresponds to a primary subband/channel.

Further, in some embodiments the blocks of the method 600 are performed in a different order than shown, and/or overlap in time with each other. For example, in one embodiment, blocks 620, 640, and 660 are performed at least partially in parallel with blocks 630, 650, and 670, respectively.

At least some of the various blocks, operations, and techniques described above with reference to FIGS. 5-15 may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method for processing a preamble of a data unit received via a communication channel, wherein the preamble includes a first preamble field, the method comprising:
   generating, using a first angle correlator, a cross-correlation output signal at least by correlating (i) a signal corresponding to the first preamble field of a received data unit with (ii) one or more repetitions of a predetermined sequence;
   generating, using a second angle correlator, a correlation output signal at least by performing a correlation operation on the cross-correlation output signal, wherein performing the correlation operation includes performing a windowed correlation operation on the cross-correlation output signal;
   generating a jammer cross-correlation output signal using the predetermined sequence;
   generating a jammer correlation output signal at least by performing a correlation operation on the jammer cross-correlation output signal;
   detecting an absence of a jammer signal based at least on the jammer correlation output signal;
   detecting the received data unit based on the correlation output signal and the detected absence of the jammer signal; and
   determining timing associated with the received data unit based on the correlation output signal.

2. A method according to claim 1, wherein:
   the preamble further includes a second preamble field immediately following the first preamble field; and
   determining timing associated with the received data unit includes determining symbol timing associated with the received data unit at least by detecting a boundary between the first preamble field and the second preamble field of the received data unit.

3. A method according to claim 1, wherein detecting the received data unit includes detecting an absence of a direct current (DC) signal.

4. A method according to claim 1, wherein:
   the first preamble field has a plurality of repetitions of a sequence;
   generating a cross-correlation output signal includes correlating (i) the signal corresponding to the first preamble field of the received data unit with (ii) a number of repetitions of the predetermined sequence; and
   the number of repetitions of the sequence is equal to the number of repetitions in the plurality of repetitions of the sequence in the first preamble field.

5. A method according to claim 1, wherein performing a correlation operation on the cross-correlation output signal includes performing an autocorrelation operation on the cross-correlation output signal.

6. A communication device comprising:
   a network interface configured to receive data units each including a preamble having a first preamble field, the network interface comprising:
   a first angle correlator unit configured to generate a cross-correlation output signal at least by correlating (i) a signal corresponding to the first preamble field of the preamble of a received data unit with (ii) one or more repetitions of a predetermined sequence;
   a second angle correlator unit configured to generate a correlation output signal at least by performing a windowed correlation operation on the cross-correlation output signal;
   a jammer cross-correlation unit configured to generate a jammer cross-correlation output signal using the predetermined sequence;
   a jammer correlation unit configured to generate a jammer correlation output signal at least by performing a correlation operation on the jammer cross-correlation output signal;
   a jammer detection logic unit configured to detect an absence of a jammer signal based at least on the jammer correlation output signal;
   a carrier sense unit configured to detect the received data unit based on the correlation output signal and the detected absence of the jammer signal; and a timing unit configured to determine timing associated with the received data unit based on the correlation output signal.

7. A communication device according to claim 6, wherein:
the preamble further includes a second preamble field immediately following the first preamble field;
the network interface includes the timing unit; and
the timing unit is configured to determine the timing associated with the received data unit by determining symbol timing associated with the received data unit at least by detecting a boundary between the first preamble field and the second preamble field of the received data unit.

8. A communication device according to claim 6, wherein the network interface includes the carrier sense unit.

9. A communication device according to claim 6, wherein the second angle correlator unit is configured to perform a correlation operation on the cross-correlation output signal by performing an autocorrelation operation on the cross-correlation output signal.

10. A communication device according to claim 6, wherein the network interface does not include a finite impulse response filter prior to the first angle correlator unit.

11. A method for processing a preamble of a data unit received via a communication channel, wherein the preamble includes (i) a first repetition of a preamble field in a first subband of the communication channel and (ii) a second repetition of the preamble field in a second subband of the communication channel, wherein the first repetition of the preamble field includes a plurality of repetitions of a first sequence, and wherein the second repetition of the preamble field includes a plurality of repetitions of a second sequence, the method comprising:
generating a first cross-correlation output signal at least by correlating (i) at least a first frequency portion of a signal corresponding to the preamble field of a received data unit with (ii) one or more repetitions of the first sequence;
generating a second cross-correlation output signal at least by correlating (i) at least a second frequency portion of the signal with (ii) one or more repetitions of the second sequence;
generating a first correlation output signal at least by performing a correlation operation on the first cross-correlation output signal;
generating a second correlation output signal at least by performing a correlation operation on the second cross-correlation output signal;
generating a first jammer cross-correlation output signal using the first sequence;
generating a second jammer cross-correlation output signal using the second sequence;
generating a first jammer correlation output signal at least by performing a correlation operation on the first jammer cross-correlation output signal;
generating a second jammer correlation output signal at least by performing a correlation operation on the second jammer cross-correlation output signal;
detecting a portion of the received data unit in the first subband based at least on the first correlation output signal, including
detecting an absence of a jammer signal in the first subband based at least on the first jammer correlation output signal; and
detecting a portion of the received data unit in the second subband based at least on the second correlation output signal, including
detecting an absence of a jammer signal in the second subband based at least on the second jammer correlation output signal.

12. A method according to claim 11, further comprising determining symbol timing of the received data unit based on at least one of (i) the first correlation output signal and (ii) the second correlation output signal.

13. A method according to claim 11, wherein:
the first sequence corresponds to a first frequency domain signal;
the second sequence corresponds to a second frequency domain signal; and
the second frequency domain signal is equal to a phase shifted version of the first frequency domain signal.

14. A communication device comprising:
a network interface configured to receive, via a communication channel, data units each including a preamble, wherein the preamble includes (i) a first repetition of a preamble field in a first subband of the communication channel and (ii) a second repetition of the preamble field in a second subband of the communication channel, wherein the first repetition of the preamble field includes a plurality of repetitions of a first sequence, and wherein the second repetition of the preamble field includes a plurality of repetitions of a second sequence, the network interface comprising
a first cross-correlation unit configured to generate a first cross-correlation output signal at least by correlating (i) at least a first frequency portion of a signal corresponding to the preamble field of a received data unit with (ii) one or more repetitions of the first sequence,
a second cross-correlation unit configured to generate a second cross-correlation output signal at least by correlating (i) at least a second frequency portion of the signal with (ii) one or more repetitions of the second sequence,
a first correlation unit configured to generate a first correlation output signal at least by performing a correlation operation on the first cross-correlation output signal,
a second correlation unit configured to generate a second correlation output signal at least by performing a correlation operation on the second cross-correlation output signal,
a first jammer cross-correlation unit configured to generate a first jammer cross-correlation output signal using the first sequence,
a second jammer cross-correlation unit configured to generate a second jammer cross-correlation output signal using the second sequence,
a first jammer correlation unit configured to generate a first jammer correlation output signal at least by performing a correlation operation on the first jammer cross-correlation output signal,
a second jammer correlation unit configured to generate a second jammer correlation output signal at least by performing a correlation operation on the second jammer cross-correlation output signal,
a first carrier sense unit configured to detect a portion of the received data unit in the first subband i) based at least on the first correlation output signal, and ii) at least by detecting an absence of a jammer signal in the first subband based at least on the first jammer correlation output signal, and
a second carrier sense unit configured to detect a portion of the received data unit in the second subband i) based at least on the second correlation output signal, and ii) at least by detecting an absence of a jammer signal in the second subband based at least on the second jammer correlation output signal.

15. A communication device according to claim 14, wherein the network interface further comprises:
a symbol timing unit configured to determine symbol timing of the received data unit based on at least one of (i) the first correlation output signal and (ii) the second correlation output signal.

* * * * *